US012764203B2

(12) United States Patent
Tang et al.

(10) Patent No.: US 12,764,203 B2
(45) Date of Patent: Oct. 13, 2026

(54) INFORMATION PROCESSING METHOD AND APPARATUS FOR ENSURING TRANSMISSION RELIABILITY OF ETHERNET DATA PACKETS

(71) Applicant: Huawei Technologies Co., Ltd., Shenzhen (CN)

(72) Inventors: Xiaowei Tang, Shenzhen (CN); Qiang Fan, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/829,680

(22) Filed: Sep. 10, 2024

(65) Prior Publication Data

US 2025/0008002 A1 Jan. 2, 2025

Related U.S. Application Data

(63) Continuation of application No. PCT/CN2023/078556, filed on Feb. 27, 2023.

(30) Foreign Application Priority Data

Mar. 11, 2022 (CN) ......................... 202210243368.5

(51) Int. Cl.
*H04L 69/04* (2022.01)
*H04L 69/22* (2022.01)

(52) U.S. Cl.
CPC .............. *H04L 69/04* (2013.01); *H04L 69/22* (2013.01)

(58) Field of Classification Search
CPC ....... H04L 69/04; H04L 69/22; H04L 69/324; H04L 67/12; H04L 12/4633
See application file for complete search history.

(56) References Cited

U.S. PATENT DOCUMENTS 8,391,148 B1 * 3/2013 Wang .................... H04L 47/365 370/235
11,388,191 B1 * 7/2022 Anvari ................ G08G 1/0112
(Continued)

OTHER PUBLICATIONS

IEEE Standard for Ethernet. IEEE Std 802.Mar. 2018.IEEE 3 Park Avenue New York, NY, Approved Jun. 14, 2018, total 5600 pages.
(Continued)

*Primary Examiner* — Muhammad Raza
(74) *Attorney, Agent, or Firm* — Slater Matsil, LLP

(57) ABSTRACT

This application provides an information processing method and apparatus. In the information processing method provided in this application, a transmitter uses, as a reference data packet, an Ethernet data packet generated based on data collected by a sensor at a historical moment, establishes corresponding data tables at a receiver and the transmitter, then differentiates a first Ethernet data packet generated based on data subsequently collected by the sensor from the reference data packet to obtain deviation information, compresses the deviation information by using a preset coding algorithm to obtain compressed information for transmission, and finally transmits, to the receiver, packet identification information corresponding to the reference data packet, second identification information of a first sensor, and the compressed information, to compress the first Ethernet data packet.

20 Claims, 7 Drawing Sheets

(56) References Cited

U.S. PATENT DOCUMENTS 11,729,667 B2 * 8/2023 Xu .................... H04L 5/0053 370/230
2006/0050703 A1 * 3/2006 Foss .................... H04L 63/1466 370/392
2007/0280207 A1 * 12/2007 Shimizu .................... H04L 61/25 370/353
2008/0008159 A1 * 1/2008 Bourlas .................... H04L 69/32 370/352
2008/0008192 A1 * 1/2008 Matoba .................... H04L 61/103 370/395.54
2011/0299538 A1 * 12/2011 Maruta .................... H04L 12/4641 370/392
2013/0314229 A1 * 11/2013 Tu .................... G08B 23/00 340/539.22
2014/0064104 A1 * 3/2014 Nataraja .................... H04L 61/103 370/254
2014/0153580 A1 * 6/2014 Chintada .................... H04L 69/04 370/392
2014/0369365 A1 * 12/2014 Denio .................... H04L 69/16 370/474
2015/0058470 A1 * 2/2015 Duda .................... H04L 12/4633 709/224
2019/0014194 A1 * 1/2019 Chen .................... H04L 69/22
2019/0116521 A1 * 4/2019 Qiao .................... H04W 28/06
2019/0124572 A1 * 4/2019 Park .................... H04L 69/04
2020/0267241 A1 * 8/2020 Johansson .................... H04L 12/4645
2020/0304339 A1 * 9/2020 Zheng .................... H04W 28/06
2021/0037350 A1 * 2/2021 Wang .................... H04W 4/08
2021/0099555 A1 * 4/2021 Isomäki .................... H04L 69/24
2021/0112448 A1 * 4/2021 Joseph .................... H04L 69/04
2021/0112449 A1 * 4/2021 Joseph .................... H04L 69/04
2021/0194996 A1 * 6/2021 Lu .................... H04L 69/18
2021/0203757 A1 * 7/2021 Lu .................... H04L 12/465
2021/0219173 A1 * 7/2021 Xu .................... H04W 72/0453
2021/0219174 A1 * 7/2021 Xu .................... H04L 69/324
2021/0243647 A1 * 8/2021 Tang .................... H04L 12/4641
2021/0266385 A1 * 8/2021 Lu .................... H04L 69/04
2021/0274384 A1 * 9/2021 Wang .................... H04W 28/06
2021/0314812 A1 * 10/2021 Catovic .................... H04W 28/06
2021/0344441 A1 * 11/2021 Zhang .................... H04L 12/46
2021/0377797 A1 * 12/2021 Lu .................... H04L 69/22
2021/0385687 A1 * 12/2021 Tang .................... H04L 69/324
2022/0007232 A1 * 1/2022 Sha .................... H04W 28/06
2022/0124554 A1 * 4/2022 Sharma .................... H04W 28/0236
2022/0150332 A1 * 5/2022 Yang .................... H04L 69/40
2022/0159099 A1 * 5/2022 Zhang .................... H04L 1/0061
2022/0166854 A1 * 5/2022 Fan .................... H04L 69/04
2022/0224782 A1 * 7/2022 Wu .................... H04L 69/323
2022/0256399 A1 * 8/2022 Fu .................... H04L 69/04
2023/0013165 A1 * 1/2023 Goldhamer .................... H04L 1/0041
2023/0092744 A1 * 3/2023 Xu .................... H04W 36/0038 370/331
2023/0113031 A1 * 4/2023 Harada .................... H04W 76/12 370/328
2023/0140866 A1 * 5/2023 Sharma .................... H04L 69/22 370/310
2023/0171727 A1 * 6/2023 Kanamarlapudi .................... H04W 76/19 370/350
2023/0180027 A1 * 6/2023 Xu .................... H04W 24/02 370/329
2023/0292392 A1 * 9/2023 Tsuboi .................... H04W 76/15
2023/0379842 A1 * 11/2023 Inoue .................... H04L 5/0098
2023/0396367 A1 * 12/2023 Hori .................... H04W 72/30
2023/0413333 A1 * 12/2023 Tsuboi .................... H04W 74/0833
2024/0057199 A1 * 2/2024 Tsuboi .................... H04W 76/25
2024/0064785 A1 * 2/2024 Tsuboi .................... H04W 76/27
2024/0163953 A1 * 5/2024 Tsuboi .................... H04W 76/20
2024/0179560 A1 * 5/2024 Xu .................... H04W 36/0011
2024/0260117 A1 * 8/2024 Hori .................... H04W 76/19
2024/0260118 A1 * 8/2024 Hori .................... H04W 76/27
2024/0260119 A1 * 8/2024 Hori .................... H04W 4/06
2024/0267991 A1 * 8/2024 Hori .................... H04W 4/06
2024/0267994 A1 * 8/2024 Hori .................... H04W 36/1443
2024/0314220 A1 * 9/2024 Fu .................... H04L 69/22
2024/0397577 A1 * 11/2024 Kawano .................... H04W 76/15
2024/0414606 A1 * 12/2024 Inoue .................... H04W 76/19
2024/0430718 A1 * 12/2024 Kawano .................... H04W 24/08
2025/0024283 A1 * 1/2025 Inoue .................... H04W 24/08
2025/0056410 A1 * 2/2025 Inoue .................... H04W 52/02
2025/0056503 A1 * 2/2025 Inoue .................... H04L 5/001
2025/0133443 A1 * 4/2025 Kawano .................... H04W 76/27
2025/0159729 A1 * 5/2025 Inoue .................... H04W 76/15

OTHER PUBLICATIONS

3GPP TS 23.501 V16.11.0 (Dec. 2021), 3rd Generation Partnership Project; Technical Specification Group Services and System Aspects; System architecture for the 5G System (5GS); Stage 2 (Release 16), total 453 pages.

3GPP TS 36.323 V16.5.0 (Dec. 2021), 3rd Generation Partnership Project; Technical Specification Group Radio Access Network; Evolved Universal Terrestrial Radio Access (E-UTRA); Packet Data Convergence Protocol (PDCP) specification (Release 16), total 57 pages.

P. Deutsch, “DEFLATE Compressed Data Format Specification version 1.3.” Network Working Group Request for Comments: 1951, May 1996, total 17 pages.

* cited by examiner

| Second identification information \ Packet identification information | 1 | 2 | … |
|---|---|---|---|
| 1 | Ethernet data packet | Ethernet data packet | |
| 2 | Ethernet data packet | | |
| ę | | | |

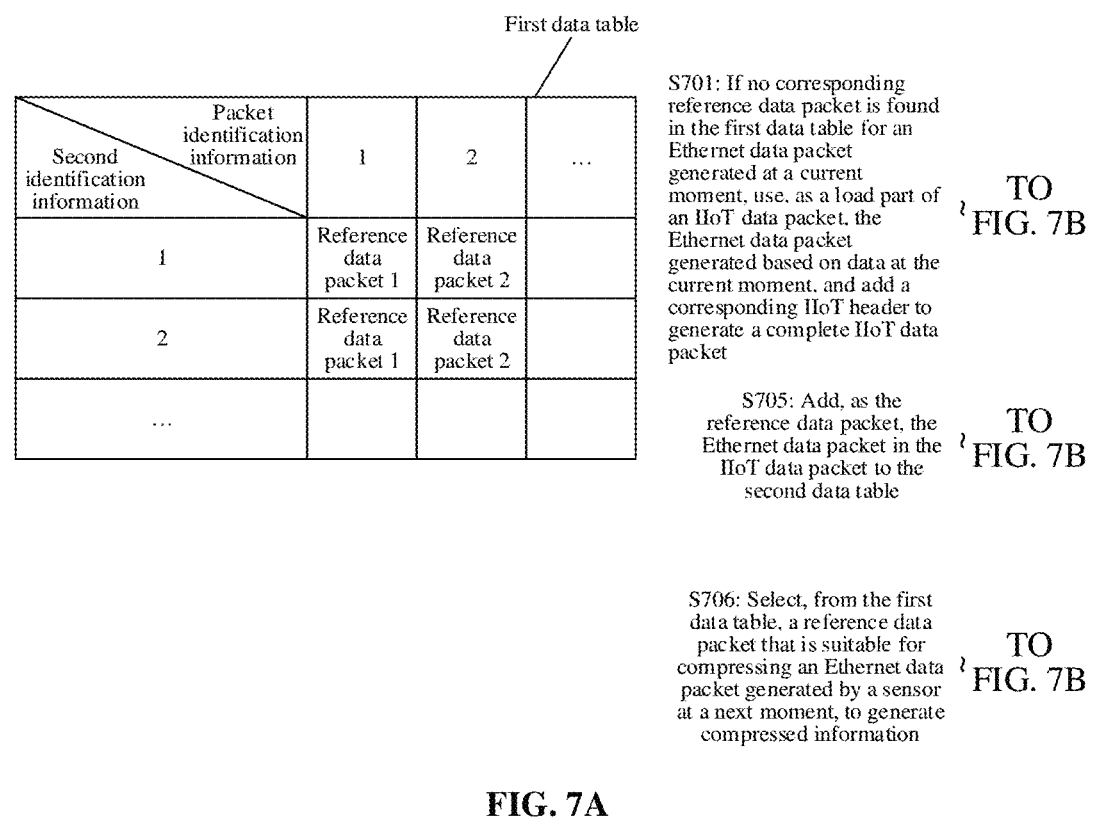

First data table

| Second identification information \ Packet identification information | 1 | 2 | … |
|---|---|---|---|
| 1 | Reference data packet 1 | Reference data packet 2 | |
| 2 | Reference data packet 1 | Reference data packet 2 | |
| … | | | |

S701: If no corresponding reference data packet is found in the first data table for an Ethernet data packet generated at a current moment, use, as a load part of an IIoT data packet, the Ethernet data packet generated based on data at the current moment, and add a corresponding IIoT header to generate a complete IIoT data packet

TO FIG. 7B

S705: Add, as the reference data packet, the Ethernet data packet in the IIoT data packet to the second data table

TO FIG. 7B

S706: Select, from the first data table, a reference data packet that is suitable for compressing an Ethernet data packet generated by a sensor at a next moment, to generate compressed information

TO FIG. 7B

FIG. 7A

INFORMATION PROCESSING METHOD AND APPARATUS FOR ENSURING TRANSMISSION RELIABILITY OF ETHERNET DATA PACKETS

CROSS-REFERENCE TO RELATED APPLICATIONS

This application is a continuation of International Application No. PCT/CN2023/078556, filed on Feb. 27, 2023, which claims priority to Chinese Patent Application No. 202210243368.5, filed on Mar. 11, 2022. The disclosures of the aforementioned applications are hereby incorporated by reference in their entireties.

TECHNICAL FIELD

This application relates to the field of internet of things technologies, and in particular, to an information processing method and apparatus.

BACKGROUND

In an Ethernet protocol-based communication system, a transmitter needs to encapsulate data into an Ethernet data packet that can be transmitted on an Ethernet (Ethernet), and then transmit the Ethernet data packet to a receiver via the Ethernet. That the transmitter encapsulates the data into the Ethernet data packet includes adding Ethernet header information to the data. However, because a size of the data is smaller than an overall size of the entire Ethernet data packet, the Ethernet header information needs to be compressed, to improve transmission efficiency or reduce a delay.

Currently, a commonly used Ethernet header compression method is as follows: When a transmitter needs to send a new Ethernet data packet to a receiver, the transmitter further sends a target context identifier (CID) corresponding to Ethernet header information (which is also referred to as a target context) of the new Ethernet data packet. Then, when receiving the new Ethernet data packet and the target CID, the receiver establishes a mapping relationship between the target CID and the target context, and feeds back, to the transmitter, information indicating successful receiving. After receiving the feedback information, the transmitter also establishes a mapping relationship between the target CID and the target context at the receiver. Then, for an Ethernet data packet subsequently received by the transmitter, the transmitter first determines whether Ethernet header information in the Ethernet data packet is the same as target Ethernet header information. If the Ethernet header information is the same as the target Ethernet header information, the target Ethernet header information is replaced with the target CID, to implement compression. After receiving a data packet that is sent by the receiver and that includes the target CID, the receiver finds the target Ethernet header information corresponding to the target CID, to restore the Ethernet data packet.

However, the compression method has a low compression rate, and cannot meet a delay requirement of an Ethernet data packet in an industrial Ethernet scenario newly proposed in the 3rd generation partnership project (3rd generation partnership project, 3GPP).

SUMMARY

This application provides an information processing method and apparatus, to increase a transmission delay of an Ethernet data packet and ensure transmission reliability of the Ethernet data packet.

According to a first aspect, this application provides an information processing method, applied to a transmitter. The method includes: generating a first Ethernet data packet, where the first Ethernet data packet carries first identification information of a first sensor and/or first data collected by the first sensor; determining second identification information of the first sensor that has a preset mapping relationship with the first identification information of the first sensor, where the preset mapping relationship includes a correspondence between first identification information of a sensor and second identification information of the sensor; if a first target Ethernet data packet corresponding to the second identification information of the first sensor exists in a first data table, determining target deviation information between the first Ethernet data packet and the first target Ethernet data packet, where the first data table includes a correspondence among the second identification information of the sensor, an Ethernet data packet, and packet identification information of the Ethernet data packet, and the first target Ethernet data packet carries the first identification information and second data collected by the first sensor; compressing the target deviation information by using a preset coding algorithm to obtain target coding deviation information; obtaining packet identification information of the first target Ethernet data packet from the first data table; and sending first information, where the first information includes first indication information and/or the target coding deviation information, and the first indication information indicates at least one of the following information: the target coding deviation information being compressed information, the second identification information of the first sensor, and the packet identification information of the first target Ethernet data packet.

In the information processing method provided in this embodiment of this application, when the first target Ethernet data packet corresponding to the second identification information of the first sensor exists in the first data table, the first target Ethernet data packet is used as a reference data packet (which is also referred to as a base in this application), then a first Ethernet data packet subsequently generated by the first sensor is differentiated from the existing reference data packet to obtain deviation information, and the deviation information is compressed by using a preset coding algorithm to obtain compressed information for transmission. Finally, packet identification information corresponding to the reference data packet, the second identification information of the first sensor, and the compressed information are transmitted to a receiver, to compress the first Ethernet data packet.

It may be understood that the information processing method provided in this embodiment of this application is a method for compressing an Ethernet data packet based on a static data table. Compared with an uplink data compression (uplink data compression, UDC) method, in the method provided in this embodiment of this application, a dynamic buffer does not need to be maintained at the transmitter and the receiver, and therefore, compression of a subsequent Ethernet data packet does not depend on a previously successfully decompressed data packet, so that reliability is improved. In addition, because existing UDC uses a sliding window manner during compression, a delay during compression is high. However, in this embodiment of this application, during compression, the subsequently generated Ethernet data packet is directly differentiated from the existing reference data packet, and then compression is performed by using an existing coding manner. Therefore, compared with the UDC, during the compression in this embodiment of this application, a delay is also reduced. In addition, compared with a method for compressing an Ethernet header, the method provided in this application can compress the entire Ethernet data packet. However, the method for compressing the Ethernet header can compress only the Ethernet header. Therefore, compared with the method for compressing the Ethernet header, in the method provided in this application, the delay is also reduced.

With reference to the first aspect, in a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

With reference to the first aspect, in a possible implementation, the method further includes: determining K pieces of deviation information of the first Ethernet data packet that respectively correspond to the K target Ethernet data packets; and determining, as the first target Ethernet data packet, a target Ethernet data packet corresponding to smallest deviation information in the K pieces of deviation information; and correspondingly, the determining target deviation information between the first Ethernet data packet and the first target Ethernet data packet includes: determining, as the target deviation information between the first Ethernet data packet and the first target Ethernet data packet, deviation information between the first Ethernet data packet and the target Ethernet data packet corresponding to the smallest deviation information.

In this implementation, when the first data table stores K pieces of target Ethernet data (which may also be referred to as K reference data packets or K bases) of the first sensor, a base with smallest deviation information between the base and the first Ethernet data packet is used as the first target Ethernet data packet (a base used when the first Ethernet data packet is compressed). It may be understood that, using the base corresponding to the smallest deviation information as the first target Ethernet data packet can further improve compression efficiency.

With reference to the first aspect, in a possible implementation, the method further includes: generating the first target Ethernet data packet; sending second information, where the second information includes second indication information and the first target Ethernet data packet, and the second indication information indicates at least one of the following information: the uncompressed first target Ethernet data packet, the second identification information of the first sensor, and the packet identification information of the first target Ethernet data packet; and establishing, in the first data table after first feedback information is received, a correspondence among the second identification information of the first sensor, the first target Ethernet data packet, and the packet identification information of the first target Ethernet data packet, where the first feedback information indicates that a receiver successfully receives the second information.

In this implementation, because the transmitter first stores the uncompressed first target Ethernet data packet in the first data table, the first Ethernet data packet can be compressed by using the first target Ethernet data packet.

With reference to the first aspect, in a possible implementation, the sending second information includes: sending the second information when the first target Ethernet data packet corresponding to the second identification information of the first sensor does not exist in the first data table.

In this implementation, when the first data table does not have a reference data packet that can be used for compression, the generated first target Ethernet data packet is directly added to the first data table. Further, for an Ethernet data packet generated based on data subsequently collected by the first sensor, the first target Ethernet data packet may be used as the reference data packet, to compress the subsequently generated Ethernet data packet.

With reference to the first aspect, in a possible implementation, the sending second information includes: if J target Ethernet data packets corresponding to the second identification information of the first sensor exist in the first data table, obtaining J pieces of deviation information of the first target Ethernet data packet that correspond to the J target Ethernet data packets, where J is less than M; and sending the second information when a ratio of a quantity of bit values that are target values and that are included in any one of the J pieces of deviation information to a total quantity of bits corresponding to the any piece of deviation information and a first preset threshold meet a preset condition, where the target value includes 0 or 1, and the preset condition includes: when the target value is 0, a ratio of a quantity of bit values that are 0 and that are included in any one of the J pieces of deviation information to a total quantity of bits corresponding to the any piece of deviation information is less than the first preset threshold; or when the target value is 1, a ratio of a quantity of bit values that are 1 and that are included in any one of the J pieces of deviation information to a total quantity of bits corresponding to the any piece of deviation information is greater than the first preset threshold.

In this implementation, after the transmitter generates the first target Ethernet data packet, even if the J target Ethernet data packets (where a quantity of included target Ethernet data packets does not reach the upper limit value M that is set for the first sensor) corresponding to the second identification information of the first sensor exist in the first data table, after the transmitter calculates the J pieces of deviation information of the first target Ethernet data packet that correspond to the J target Ethernet data packets, if the quantity of bit values that are the target values and that are included in the any one of the J pieces of deviation information and the first preset threshold meet the preset condition, the transmitter does not use any one of the J target Ethernet data packets to compress the first target Ethernet data, but still sends the first target Ethernet data packet as an uncompressed data packet. It may be understood that, in this manner, because a stored first target Ethernet data packet is different from a stored target Ethernet data packet, flexibility of selecting a reference data packet for a subsequently generated Ethernet data packet can be improved, thereby helping improve a compression effect.

With reference to the first aspect, in a possible implementation, the sending second information includes: if M target Ethernet data packets corresponding to the second identification information of the first sensor exist in the first data table, obtaining M pieces of deviation information of the first target Ethernet data packet that respectively correspond to the M target Ethernet data packets; and sending the second information when a ratio of a quantity of bit values that are target values and that are included in any one of the M pieces of deviation information to a total quantity of bits corresponding to the any piece of deviation information and a second preset threshold meet a preset condition, where the target value includes 0 or 1, and the preset condition includes: when the target value is 0, a ratio of a quantity of bit values that are 0 and that are included in any one of the J pieces of deviation information to a total quantity of bits corresponding to the any piece of deviation information is less than the second preset threshold; or when the target value is 1, a ratio of a quantity of bit values that are 1 and that are included in any one of the J pieces of deviation information to a total quantity of bits corresponding to the any piece of deviation information is greater than the second preset threshold; and correspondingly, the establishing, in the first data table after first feedback information is received, a correspondence among the second identification information of the first sensor, the first target Ethernet data packet, and the packet identification information of the first target Ethernet data packet includes: after the first feedback information is received, when a correspondence among the second identification information of the first sensor, an $i^{th}$ Ethernet data packet, and packet identification information of the $i^{th}$ Ethernet data packet is deleted from the first data table, establishing, in the first data table, the correspondence among the second identification information of the first sensor, the first target Ethernet data packet, and the packet identification information of the first target Ethernet data packet, where the $i^{th}$ Ethernet data packet is a target Ethernet data packet that is in the M target Ethernet data packets and that corresponds to largest deviation information between the target Ethernet data packet and the first target Ethernet data packet.

In this implementation, after the transmitter generates the first target Ethernet data packet, even if the M target Ethernet data packets (where a quantity of included target Ethernet data packets reaches the upper limit value M that is set for the first sensor) corresponding to the second identification information of the first sensor exist in the first data table, after the transmitter calculates the M pieces of deviation information of the first target Ethernet data packet that correspond to the M target Ethernet data packets, if the ratio of the quantity of bit values that are the target values and that are included in the any one of the M pieces of deviation information to the total quantity of bits corresponding to the any piece of deviation information and the second preset threshold meet the preset condition, the transmitter does not use any one of the M target Ethernet data packets to compress the first target Ethernet data, but still sends the first target Ethernet data packet as an uncompressed data packet. Then, after the feedback information of the receiver is received, a target Ethernet data packet that is in the M target Ethernet data packets and that corresponds to a maximum ratio in the deviation information between the target Ethernet data packet and the first target Ethernet data packet is first deleted, and then the correspondence among the second identification information of the first sensor, the first target Ethernet data packet, and the packet identification information of the first target Ethernet data packet is established in the first data table. It may be understood that, when the reference data packet is stored in the first data table in this manner, a compression effect is improved.

With reference to the first aspect, in a possible implementation, the method further includes: sending fourth information, where the fourth information indicates to delete the correspondence among the second identification information of the first sensor, an $i^{th}$ Ethernet data packet, and packet identification information of the $i^{th}$ Ethernet data packet.

In this implementation, when the M target Ethernet data packets corresponding to the second identification information of the first sensor exist in the first data table, if the transmitter deletes the previously stored correspondence among the second identification information of the first sensor, an $i^{th}$ Ethernet data packet, and packet identification information of the $i^{th}$ Ethernet data packet, the transmitter may further send indication information to the receiver, to indicate the deleted correspondence to the receiver.

With reference to the first aspect, in a possible implementation, the method further includes: sending third information when the first feedback information is not received, where the third information includes third indication information and a second Ethernet data packet, the third indication information indicates at least one of the following information: the uncompressed second Ethernet data packet, the second identification information of the first sensor, and packet identification information of the second Ethernet data packet, and the second Ethernet data packet carries the first identification information of the first sensor and third data collected by the first sensor; and establishing, in the first data table after second feedback information is received, the correspondence among the second identification information of the first sensor, the first target Ethernet data packet, and the packet identification information of the first target Ethernet data packet, where the second feedback information indicates that the receiver successfully receives the third information, the first target Ethernet data packet is the second Ethernet data packet, and identification information of the first target Ethernet data packet is the packet identification information of the second Ethernet data packet.

In this implementation, when the transmitter receives no first feedback information sent by the receiver, the transmitter does not add an Ethernet data packet generated based on the second data to the first data table. It may be understood that in this method, reliability of establishing a data table between the transmitter and the receiver can be ensured.

With reference to the first aspect, in a possible implementation, if the first target Ethernet data packet corresponding to the second identification information of the first sensor does not exist in the first data table, the method further includes: sending fifth information, where the fifth information includes fifth indication information and the first Ethernet data packet, and the fifth indication information indicates at least one of the following information: the uncompressed first Ethernet data packet, the second identification information of the first sensor, and packet identification information of the first Ethernet data packet; and establishing, in the first data table after third feedback information is received, a correspondence among the second identification information of the first sensor, the first Ethernet data packet, and the packet identification information of the first Ethernet data packet, where the third feedback information indicates that the receiver successfully receives the fifth information.

In this implementation, when the first target Ethernet data packet corresponding to the second identification information of the first sensor does not exist in the first data table, the first Ethernet data packet is sent without being compressed, and the fifth indication information is further sent, to store, in the data table (where the transmitter is the first data table, and the receiver is the second data table), the same correspondence among the second identification information of the first sensor, the first Ethernet data packet, and the packet identification information of the first Ethernet data packet.

According to a second aspect, this application provides an information processing method, applied to a receiver, where the method includes: receiving first information, where the first information includes first indication information and target coding deviation information, and the first indication information indicates at least one of the following information: the target coding deviation information being compressed information, second identification information of a first sensor, and packet identification information of a first target Ethernet data packet; obtaining, from a second data table, the first target Ethernet data packet corresponding to the second identification information of the first sensor and the packet identification information of the first target Ethernet data packet, where the second data table includes a correspondence among second identification information of a sensor, an Ethernet data packet, and packet identification information of the Ethernet data packet, and the first target Ethernet data packet carries first identification information of the first sensor and second data collected by the first sensor; decoding the target coding deviation information by using a preset decoding algorithm to obtain target deviation information, where the target deviation information indicates deviation information between a first Ethernet data packet and the first target Ethernet data packet, and the first Ethernet data packet carries the first identification information of the first sensor and/or first data collected by the first sensor; and restoring the first Ethernet data packet based on the first target Ethernet data packet and the target deviation information.

In the information processing method provided in this embodiment, after obtaining packet identification information corresponding to a reference data packet, the second identification information of the first sensor, and the compressed information that are sent by a transmitter, the receiver first decodes the compressed information by using a preset decoding algorithm to obtain deviation information between the first Ethernet data packet and the reference data packet, then obtains the reference data packet based on the packet identification information of the reference data packet and the second identification information of the first sensor that are sent by the transmitter, and finally restores the first Ethernet data packet based on the reference data packet and the deviation information.

With reference to the second aspect, in a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

With reference to the second aspect, in a possible implementation, the method further includes: receiving second information, where the second information includes second indication information and the first target Ethernet data packet, and the second indication information indicates at least one of the following information: the uncompressed first target Ethernet data packet, the second identification information of the first sensor, and the packet identification information of the first target Ethernet data packet; establishing, in the second data table, a correspondence among the second identification information of the first sensor, the first target Ethernet data packet, and the packet identification information of the first target Ethernet data packet; and sending first feedback information, where the first feedback information indicates that the receiver successfully receives the second information.

With reference to the second aspect, in a possible implementation, the establishing, in the second data table, a correspondence among the second identification information of the first sensor, the first target Ethernet data packet, and the packet identification information of the first target Ethernet data packet includes: receiving fourth information, where the fourth information indicates to delete a correspondence among the second identification information of the first sensor, an $i^{th}$ Ethernet data packet, and packet identification information of the $i^{th}$ Ethernet data packet, and i is less than M; and after the correspondence among the second identification information of the first sensor, the $i^{th}$ Ethernet data packet, and the packet identification information of the $i^{th}$ Ethernet data packet is deleted from the second data table, establishing, in the second data table, the correspondence among the second identification information of the first sensor, the first target Ethernet data packet, and the packet identification information of the first target Ethernet data packet.

With reference to the second aspect, in a possible implementation, when the first feedback information is not sent, the method further includes: receiving third information, where the third information includes third indication information and a second Ethernet data packet, and the third indication information indicates at least one of the following information: the uncompressed second Ethernet data packet, the second identification information of the first sensor, and packet identification information of the second Ethernet data packet, and the second Ethernet data packet carries the first identification information of the first sensor and third data collected by the first sensor; establishing, in the second data table, the correspondence among the second identification information of the first sensor, the first target Ethernet data packet, and the packet identification information of the first target Ethernet data packet, where the first target Ethernet data packet is the second Ethernet data packet, and identification information of the first target Ethernet data packet is the packet identification information of the second Ethernet data packet; and sending second feedback information, where the second feedback information indicates that the receiver successfully receives the third information.

With reference to the second aspect, in a possible implementation, the method further includes: receiving fifth information, where the fifth information includes fifth indication information and the first Ethernet data packet, and the fifth indication information indicates at least one of the following information: the uncompressed first Ethernet data packet, the second identification information of the first sensor, and packet identification information of the first Ethernet data packet; establishing, in the second data table, a correspondence among the second identification information of the first sensor, the first Ethernet data packet, and the packet identification information of the first Ethernet data packet; and sending third feedback information, where the third feedback information indicates that the receiver successfully receives the fifth information.

According to a third aspect, this application provides an information processing apparatus, where the apparatus is used in a receiver. The apparatus includes a processing module, configured to generate a first Ethernet data packet. The first Ethernet data packet carries first identification information of a first sensor and/or first data collected by the first sensor. The processing module is further configured to determine second identification information of the first sensor that has a preset mapping relationship with the first identification information of the first sensor. The preset mapping relationship includes a correspondence between the first identification information of the sensor and the second identification information of the sensor. The processing module is further configured to: if a first target Ethernet data packet corresponding to the second identification information of the first sensor exists in a first data table, determine target deviation information between the first Ethernet data packet and the first target Ethernet data packet. The first data table includes a correspondence among the second identification information of the sensor, an Ethernet data packet, and packet identification information of the Ethernet data packet. The first target Ethernet data packet carries the first identification information and second data collected by the first sensor. The processing module is further configured to compress the target deviation information by using a preset coding algorithm to obtain target coding deviation information. The processing module is further configured to obtain packet identification information of the first target Ethernet data packet from the first data table. The apparatus includes: a transceiver module, configured to send first information, where the first information includes first indication information and the target coding deviation information. The first indication information indicates at least one of the following information: the target coding deviation information being compressed information, the second identification information of the first sensor, and the packet identification information of the first target Ethernet data packet.

With reference to the third aspect, in a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

With reference to the third aspect, in a possible implementation, the processing module is further configured to: determine K pieces of deviation information of the first Ethernet data packet that respectively correspond to the K target Ethernet data packets; determine, as the first target Ethernet data packet, a target Ethernet data packet corresponding to smallest deviation information in the K pieces of deviation information; and determine, as the target deviation information between the first Ethernet data packet and the first target Ethernet data packet, deviation information between the first Ethernet data packet and the target Ethernet data packet corresponding to the smallest deviation information.

With reference to the third aspect, in a possible implementation, the processing module is further configured to generate the first target Ethernet data packet. The transceiver module is further configured to send second information. The second information includes second indication information and the first target Ethernet data packet. The second indication information indicates at least one of the following information: the uncompressed first target Ethernet data packet, the second identification information of the first sensor, and the packet identification information of the first target Ethernet data packet. The processing module is further configured to: establish, in the first data table after first feedback information is received, a correspondence among the second identification information of the first sensor, the first target Ethernet data packet, and the packet identification information of the first target Ethernet data packet. The first feedback information indicates that the receiver successfully receives the second information.

With reference to the third aspect, in a possible implementation, the transceiver module is specifically configured to: send the second information when the first target Ethernet data packet corresponding to the second identification information of the first sensor does not exist in the first data table.

With reference to the third aspect, in a possible implementation, the processing module is specifically configured to: if J target Ethernet data packets corresponding to the second identification information of the first sensor exist in the first data table, obtain J pieces of deviation information of the first target Ethernet data packet that correspond to the J target Ethernet data packets. J is less than M. The transceiver module is specifically configured to: send the second information when a ratio of a quantity of bit values that are target values and that are included in any one of the J pieces of deviation information to a total quantity of bits corresponding to the any piece of deviation information and a first preset threshold meet a preset condition. The target value includes 0 or 1. The preset condition includes: when the target value is 0, a ratio of a quantity of bit values that are 0 and that are included in any one of the J pieces of deviation information to a total quantity of bits corresponding to the any piece of deviation information is less than the first preset threshold; or when the target value is 1, a ratio of a quantity of bit values that are 1 and that are included in any one of the J pieces of deviation information to a total quantity of bits corresponding to the any piece of deviation information is greater than the first preset threshold.

With reference to the third aspect, in a possible implementation, the processing module is specifically configured to: if M target Ethernet data packets corresponding to the second identification information of the first sensor exist in the first data table, obtain M pieces of deviation information of the first target Ethernet data packet that respectively correspond to the M target Ethernet data packets. The transceiver module is specifically configured to: send the second information when a ratio of a quantity of bit values that are target values and that are included in any one of the M pieces of deviation information to a total quantity of bits corresponding to the any piece of deviation information and a second preset threshold meet a preset condition. The target value includes 0 or 1. The preset condition includes: when the target value is 0, a ratio of a quantity of bit values that are 0 and that are included in any one of the J pieces of deviation information to a total quantity of bits corresponding to the any piece of deviation information is less than the second preset threshold; or when the target value is 1, a ratio of a quantity of bit values that are 1 and that are included in any one of the J pieces of deviation information to a total quantity of bits corresponding to the any piece of deviation information is greater than the second preset threshold. Correspondingly, the processing module is further configured to: after the first feedback information is received, when a correspondence among the second identification information of the first sensor, an $i^{th}$ Ethernet data packet, and packet identification information of the $i^{th}$ Ethernet data packet is deleted from the first data table, establish, in the first data table, the correspondence among the second identification information of the first sensor, the first target Ethernet data packet, and the packet identification information of the first target Ethernet data packet. The $i^{th}$ Ethernet data packet is a target Ethernet data packet that is in the M target Ethernet data packets and that corresponds to a maximum ratio in the deviation information between the target Ethernet data packets and the first target Ethernet data packet.

With reference to the third aspect, in a possible implementation, the transceiver module is further configured to send fourth information. The fourth information indicates to delete the correspondence among the second identification information of the first sensor, an $i^{th}$ Ethernet data packet, and the packet identification information of the $i^{th}$ Ethernet data packet.

With reference to the third aspect, in a possible implementation, the transceiver module is further configured to: send third information when the first feedback information is not received. The third information includes third indication information and a second Ethernet data packet. The third indication information indicates at least one of the following information: the uncompressed second Ethernet data packet, the second identification information of the first sensor, and packet identification information of the second Ethernet data packet. The second Ethernet data packet carries the first identification information of the first sensor and third data collected by the first sensor. The processing module is further configured to: establish, in the first data table after second feedback information is received, the correspondence among the second identification information of the first sensor, the first target Ethernet data packet, and the packet identification information of the first target Ethernet data packet. The second feedback information indicates that the receiver successfully receives the third information. The first target Ethernet data packet is the second Ethernet data packet. Identification information of the first target Ethernet data packet is the packet identification information of the second Ethernet data packet.

With reference to the third aspect, in a possible implementation, if the first target Ethernet data packet corresponding to the second identification information of the first sensor does not exist in the first data table, the transceiver module is further configured to send fifth information. The fifth information includes fifth indication information and the first Ethernet data packet. The fifth indication information indicates at least one of the following information: the uncompressed first Ethernet data packet, the second identification information of the first sensor, and packet identification information of the first Ethernet data packet. The processing module is further configured to: establish, in the first data table after third feedback information is received, a correspondence among the second identification information of the first sensor, the first Ethernet data packet, and the packet identification information of the first Ethernet data packet. The third feedback information indicates that the receiver successfully receives the fifth information.

According to a fourth aspect, this application provides an information processing apparatus, where the apparatus is used in a receiver. The apparatus includes a transceiver module, configured to receive first information. The first information includes first indication information and target coding deviation information. The first indication information indicates at least one of the following information: the target coding deviation information being compressed information, second identification information of a first sensor, and packet identification information of a first target Ethernet data packet. The apparatus includes a processing module, configured to obtain, from a second data table, the first target Ethernet data packet corresponding to the second identification information of the first sensor and the packet identification information of the first target Ethernet data packet. The second data table includes a correspondence among the second identification information of the sensor, an Ethernet data packet, and packet identification information of the Ethernet data packet. The first target Ethernet data packet carries first identification information of the first sensor and second data collected by the first sensor. The processing module is further configured to decode the target coding deviation information by using a preset decoding algorithm to obtain target deviation information. The target deviation information indicates deviation information between a first Ethernet data packet and the first target Ethernet data packet. The first Ethernet data packet carries the first identification information of the first sensor and/or first data collected by the first sensor. The processing module is further configured to restore the first Ethernet data packet based on the first target Ethernet data packet and the target deviation information.

With reference to the fourth aspect, in a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

With reference to the fourth aspect, in a possible implementation, the transceiver module is further configured to receive second information. The second information includes second indication information and the first target Ethernet data packet. The second indication information indicates at least one of the following information: the uncompressed first target Ethernet data packet, the second identification information of the first sensor, and the packet identification information of the first target Ethernet data packet. The processing module is further configured to establish, in the second data table, a correspondence among the second identification information of the first sensor, the first target Ethernet data packet, and the packet identification information of the first target Ethernet data packet. The transceiver module is further configured to send first feedback information. The first feedback information indicates that the receiver successfully receives the second information.

With reference to the fourth aspect, in a possible implementation, the processing module is specifically configured to: receive fourth information, where the fourth information indicates to delete a correspondence among the second identification information of the first sensor, an $i^{th}$ Ethernet data packet, and packet identification information of the $i^{th}$ Ethernet data packet, and i is less than M; and after the correspondence among the second identification information of the first sensor, the $i^{th}$ Ethernet data packet, and the packet identification information of the $i^{th}$ Ethernet data packet is deleted from the second data table, establish, in the second data table, the correspondence among the second identification information of the first sensor, the first target Ethernet data packet, and the packet identification information of the first target Ethernet data packet.

With reference to the fourth aspect, in a possible implementation, when the first feedback information is not sent, the transceiver module is further configured to receive third information. The third information includes third indication information and a second Ethernet data packet. The third indication information indicates at least one of the following information: the uncompressed second Ethernet data packet, the second identification information of the first sensor, and packet identification information of the second Ethernet data packet. The second Ethernet data packet carries the first identification information of the first sensor and third data collected by the first sensor. The processing module is further configured to establish, in the second data table, the correspondence among the second identification information of the first sensor, the first target Ethernet data packet, and the packet identification information of the first target Ethernet data packet. The first target Ethernet data packet is the second Ethernet data packet. Identification information of the first target Ethernet data packet is the packet identification information of the second Ethernet data packet. The transceiver module is further configured to send second feedback information. The second feedback information indicates that the receiver successfully receives the third information.

With reference to the fourth aspect, in a possible implementation, the transceiver module is further configured to receive fifth information. The fifth information includes fifth indication information and the first Ethernet data packet. The fifth indication information indicates at least one of the following information: the uncompressed first Ethernet data packet, the second identification information of the first sensor, and packet identification information of the first Ethernet data packet. The processing module is further configured to establish, in the second data table, a correspondence among the second identification information of the first sensor, the first Ethernet data packet, and the packet identification information of the first Ethernet data packet. The transceiver module is further configured to send third feedback information. The third feedback information indicates that the receiver successfully receives the fifth information.

According to a fifth aspect, this application provides a terminal device, including an information processing apparatus configured to perform the method according to any one of the first aspect or the possible implementations of the first aspect.

According to a sixth aspect, this application provides a server, including an information processing apparatus configured to perform the method according to any one of the second aspect or the possible implementations of the second aspect.

According to a seventh aspect, this application provides an information processing apparatus, including a memory and a processor. The memory is configured to store program instructions. The processor is configured to invoke the program instructions in the memory to perform the method according to any one of the first aspect, the second aspect, or the possible implementations of the first aspect or the second aspect.

According to an eighth aspect, this application provides a computer-readable medium. The computer-readable medium stores program code to be executed by a computer. The program code includes instructions used to perform the method according to any one of the first aspect, the second aspect, or the possible implementations of the first aspect or the second aspect.

According to a ninth aspect, this application provides a computer program product. The computer program product includes computer program code. When the computer program code runs on a computer, the computer is enabled to implement the method according to any one of the first aspect, the second aspect, or the possible implementations of the first aspect or the second aspect.

For technical effects brought by any one of the implementations of the second aspect to the ninth aspect, refer to technical effects brought by any one of the possible implementations of the first aspect. Details are not described.

BRIEF DESCRIPTION OF THE DRAWINGS

FIG. 7A and FIG. 7B are a diagram of a structure of creating reference data packets in data tables at a receiver and a transmitter according to an embodiment of this application;

DETAILED DESCRIPTION OF ILLUSTRATIVE EMBODIMENTS

Figure 1:
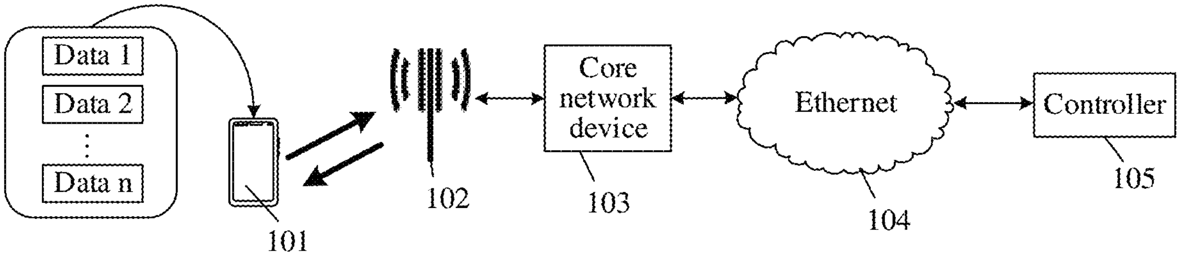
FIG. 1 is a diagram of a structure of a communication system according to an embodiment of this application.

FIG. 1 is a diagram of a structure of a communication system according to an embodiment of this application. As shown in FIG. 1, the communication system 100 includes a terminal device 101, an access network (access network, AN) device 102, a core network (core network, CN) device 103, an Ethernet (Ethernet) 104, and a controller 105.

The terminal device 101 may also be referred to as user equipment (user equipment, UE), a mobile station (mobile station, MS), a mobile terminal (mobile terminal, MT), a terminal, or the like. The terminal device may be widely used in various scenarios, for example, device-to-device (device-to-device, D2D), vehicle-to-everything (vehicle-to-everything, V2X) communication, machine-type communication (machine-type communication, MTC), internet of things (internet of things, IoT), virtual reality, augmented reality, industrial control, self-driving, telemedicine, a smart grid, smart furniture, a smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a mechanical arm, a smart home device, or the like. A specific technology and a specific device form that are used by the terminal are not limited in embodiments of this application. In this application, for ease of description, a chip deployed in the foregoing device, or a chip may also be referred to as a terminal device.

A main function of the access network device 102 is to control the terminal device 101 to perform radio access to a mobile communication network. The device includes but is not limited to an evolved NodeB (evolved NodeB, eNB or eNodeB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission reception point, TRP), and the like. Alternatively, the device may be a gNB or a transmission point (TRP or TP) in 5G such as an NR system, or one or a group (including a plurality of antenna panels) of antenna panels of a base station in a 5G system, or may be a network node, such as a baseband unit (BBU) or a distributed unit (distributed unit, DU), that constitutes a gNB or a transmission point.

In some deployments, the gNB may include a central unit (central unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified into a network device in an access network (radio access network, RAN), or the CU may be classified into a network device in a core network (core network, CN). This is not limited in this application.

The terminal device 101 and the access network device 102 may be deployed on the land, including indoors or outdoors and handheld or vehicle-mounted, may be deployed on a water surface, or may be deployed on an airplane, a balloon, and a satellite in the air. Application scenarios of the terminal device 101 and the access network device 102 are not limited in embodiments of this application.

The terminal device 101 and the access network device 102 may communicate with each other by using a licensed spectrum or an unlicensed spectrum, or may communicate with each other by using both a licensed spectrum and an unlicensed spectrum; or may communicate with each other by using a spectrum below 6 gigahertz (gigahertz, GHz) or a spectrum above 6 GHz, or may communicate with each other by using both a spectrum below 6 GHz and a spectrum above 6 GHz. A spectrum resource used for wireless communication is not limited in embodiments of this application.

The core network device 103 is mainly configured to: provide a terminal device connection, manage the terminal device, and complete carrying a service, and serves as a bearer network to provide an interface to an external network (for example, an Ethernet).

The Ethernet 104 is mainly responsible for providing a transmission network for communication between the terminal device 101 and the controller 105.

The controller 105 is a device that communicates with the terminal device 101, and can analyze and process data sent by the terminal device, to perform a corresponding function based on an analysis result or a processing result.

It may be understood that quantities of terminal devices, access network devices, core network devices, and controllers shown in FIG. 1 are merely examples. In an actual process, the quantities of terminal devices, access network devices, core network devices, and controllers may alternatively be other quantities.

It should be further noted herein that, in embodiments of this application, the terminal device or the access network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that communication can be performed according to the method provided in embodiments of this application by running a program that records code of the method provided in embodiments of this application. For example, the method provided in embodiments of this application may be performed by the terminal device or the network device, or may be performed by a functional module that is in the terminal device or the network device and that can invoke a program and execute the program.

In addition, methods in aspects of this application may be implemented through programming, and a computer program that can be accessed by a computer-readable component, carrier, or medium is formed. For example, the computer-readable medium may include but is not limited to: a magnetic storage component (for example, a hard disk drive, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include, and/or carry instructions and/or data.

For the communication system shown in FIG. 1, the terminal device 101 usually includes a plurality of sensors, for example, a temperature sensor or a humidity sensor. Usually, the terminal device 101 sends, to the controller 105, data collected by the sensor, so that the controller can analyze and process the data collected by the sensor, to perform a corresponding function based on an analysis result or a processing result. Specifically, after collecting the data via the sensor, the terminal device 101 encapsulates the data into an Ethernet data packet that can be transmitted on an Ethernet, and then the Ethernet data packet sequentially passes through the access network device and the core network device, and is transmitted to the controller via the Ethernet. Finally, the controller decapsulates the Ethernet data packet to obtain the data collected by the terminal device 101 via the sensor. More specifically, that the terminal device encapsulates the data into the Ethernet data packet that can be transmitted on the Ethernet includes adding Ethernet header information to the data. However, because a size of the data is smaller than an overall size of the entire Ethernet data packet, the Ethernet header information needs to be compressed, to improve transmission efficiency or reduce a delay.

Currently, a commonly used Ethernet header compression method is as follows: When a transmitter needs to send a new Ethernet data packet to a receiver, the transmitter further sends a target context identifier (context identifier, CID) corresponding to Ethernet header information (which is also referred to as a target context) of the new Ethernet data packet. Then, when receiving the new Ethernet data packet and the target CID, the receiver establishes a mapping relationship between the target CID and the target context, and feeds back, to the transmitter, information indicating successful receiving. After receiving the feedback information, the transmitter also establishes a mapping relationship between the target CID and the target context at the receiver. Then, for an Ethernet data packet subsequently received by the transmitter, the transmitter first determines whether Ethernet header information in the Ethernet data packet is the same as target Ethernet header information. If the Ethernet header information is the same as the target Ethernet header information, the target Ethernet header information is replaced with the target CID, to implement compression. After receiving a data packet that is sent by the receiver and that includes the target CID, the receiver finds the target Ethernet header information corresponding to the target CID, to restore the Ethernet data packet.

In addition, currently, there is another commonly used method for compressing an Ethernet data packet, that is, an uplink data compression (uplink data compression, UDC) method. The UDC method is actually a combination of an "LZ77" algorithm and Hoffman (Huffman) coding. A core idea of the UDC method is to maintain a dynamic buffer (buffer) at both a receiver and a transmitter, and then compress/decompress the entire Ethernet data packet by using content in the buffer. It should be noted herein that for detailed content of the UDC method, refer to descriptions in a related technology. Details are not described herein again.

However, with rapid development of internet of things technologies, industrial internet of things (industrial internet of things, IIoT) has also developed rapidly. The IIoT can be defined as that "machines, computers, and personnel use advanced data analysis results obtained through service transformation to implement intelligent industrial operations". With rapid development of the IIoT, many application scenarios gradually emerge, for example, a smart city and unmanned driving. According to network requirements of different applications, a fifth generation mobile communication system is also developed from three aspects: an enhanced mobile broadband (enhanced mobile broadband, eMBB), ultra-reliable and low latency communication (ultra-reliable and Low latency communication, URLLC), and massive machine type communication (massive Machine type communication, mMTC).

In an IIoT scenario, a slight delay in communication between the transmitter and the receiver may cause great impact on a factory. For example, for the communication system shown in FIG. 1, data 1, data 2, . . . , and data n that are collected by the terminal device 101 need to be transmitted to the controller 105 in an ultra-low delay and high reliability manner, so that the controller 105 can determine, based on analysis and processing results of the data 1, the data 2, . . . , and the data n, actions that need to be performed. However, if transmission delays of the data 1, the data 2, . . . , and the data n are high, decisions of the controller may be affected, and a security accident is caused. Therefore, in the IIoT scenario, ultra-low delay and ultra-reliable network quality is required.

However, in the foregoing method for compressing the Ethernet header, for frame structures of different protocols, fields that can be compressed are fixed, and a semi-static/static field beyond a definition of the Ethernet header cannot be compressed, resulting in a large information redundancy of a transmission frame. In addition, the method for compressing the Ethernet header is applicable only to a standard "IEEE 802.3" Ethernet frame, and cannot flexibly adapt to an industrial Ethernet protocol corresponding to the IIoT. For UDC, an algorithm used by the transmitter to perform compression is complex, resulting in a high processing delay. In addition, the UDC strictly depends on synchronization between receiving and sending buffers. Once a packet loss occurs on an air interface, the UDC is reset, causing a problem of continuous decompression errors of data packets at the receiver and low reliability.

In other words, neither the method for compressing the Ethernet header nor the UDC method can meet requirements of an ultra-low delay and ultra-high reliability of an Ethernet data packet in an IIoT scenario newly proposed in the 3rd generation partnership project (3rd generation partnership project, 3GPP).

In view of this, this application provides an information processing method and apparatus. In the information processing method provided in this application, an Ethernet data packet generated based on data collected by a sensor at a historical moment is used as a reference data packet (where the reference data packet is also referred to as a base in embodiments of this application), and corresponding data tables are established at a receiver and a transmitter. Then, a first Ethernet data packet generated based on data subsequently collected by the sensor is differentiated from the reference data packet to obtain deviation information, and the deviation information is encoded by using a preset coding technology to obtain target coding deviation information. Packet identification information of the reference data packet, identification information of the sensor of the reference data packet, and the target coding deviation information are transmitted to the receiver. After receiving the packet identification information of the reference data packet, the identification information of the sensor of the reference data packet, and the deviation information, the receiver may determine, based on a local data table at the receiver, a reference data packet corresponding to the packet identification information of the reference data packet and the identification information of the sensor of the reference data packet, and then restore the first Ethernet data packet based on the reference data packet and the deviation information.

Figure 2:
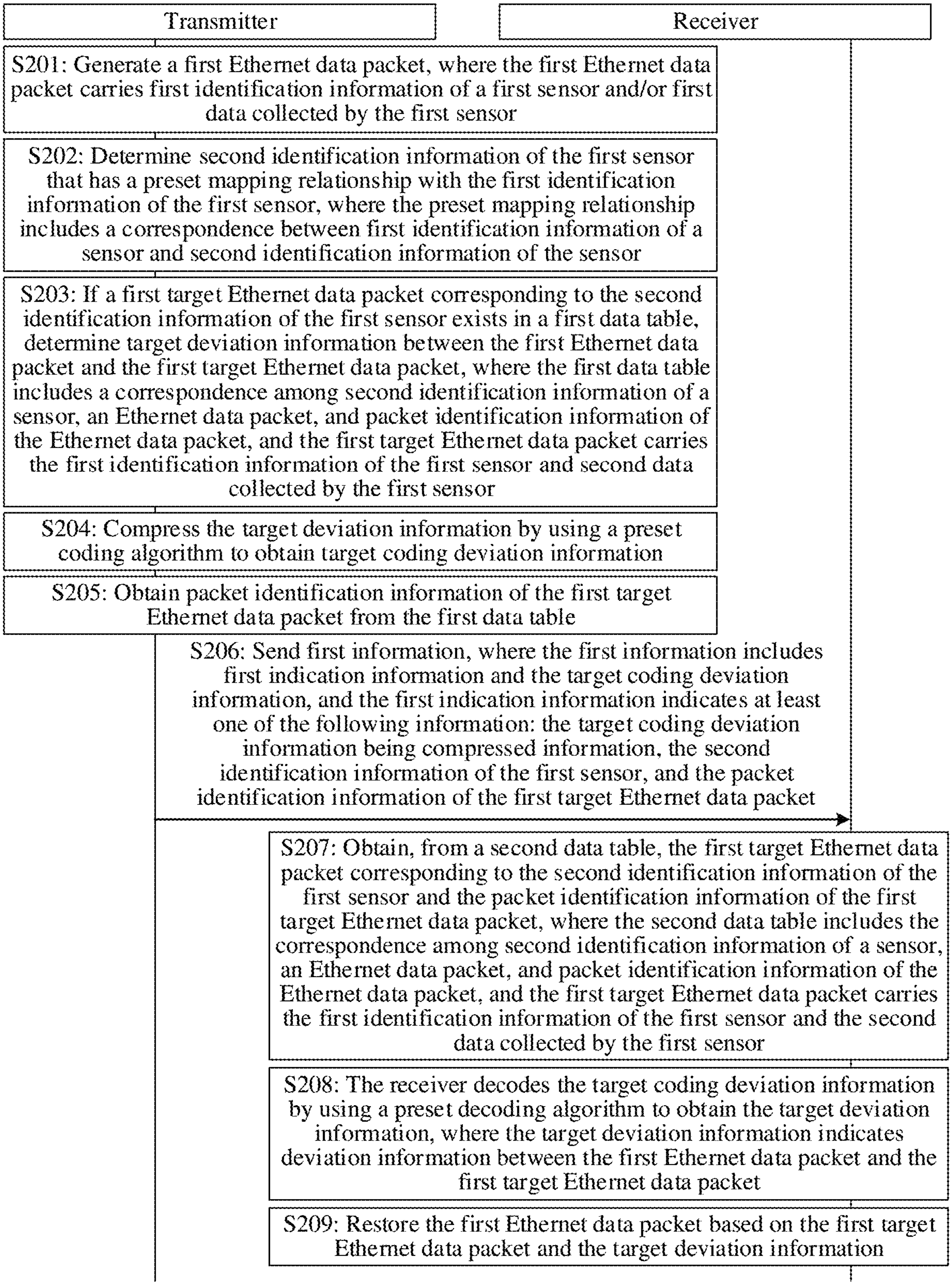
FIG. 2 is a schematic flowchart of an information processing method according to an embodiment of this application.

The following describes the information processing method in embodiments of this application with reference to FIG. 2. In FIG. 2, an example in which the transmitter and the receiver are used as execution bodies of interaction examples is used for illustrating the method, and the execution bodies of the interaction examples are not limited in this application. For example, the transmitter in FIG. 2 may alternatively be a chip, a chip system, or a processor that supports the transmitter in implementing the method, or may be a logical module or software that can implement all or some functions of the transmitter. The receiver in FIG. 2 may alternatively be a chip, a chip system, or a processor that supports the receiver in implementing the method, or may be a logical module or software that can implement all or some functions of the receiver. It should be further noted herein that, in this embodiment, the transmitter is also referred to as a compression side, and the receiver is also referred to as a decompression side. This does not constitute a limitation on this embodiment of this application.

FIG. 2 is a schematic flowchart of an information processing method according to an embodiment of this application. As shown in FIG. 2, the method in this embodiment may include S201, S202, S203, S204, S205, S206, S207, S208, and S209. Sending first information in S201 to S206 is performed by a transmitter, and receiving the first information in S206 to S209 is performed by a receiver.

S201: The transmitter generates a first Ethernet data packet, where the first Ethernet data packet carries first identification information of a first sensor and/or first data collected by the first sensor.

In this embodiment, the first data is data collected by the first sensor. It should be noted herein that a specific attribute of the data is not limited in this embodiment of this application. For example, when a type of the first sensor is a temperature sensor, the first data may be temperature data; when a type of the first sensor is a humidity sensor, the first data may be humidity data; or when a type of the first sensor is a barometer pressure sensor, the first data may be barometric pressure data. This does not constitute a limitation on this application.

It should be noted herein that a specific form of the transmitter is not limited in this embodiment of this application. For example, when the first sensor is a smart sensor, the smart sensor is used as the transmitter; or when the first sensor is not a smart sensor, a terminal device in which the smart sensor is located may be used as the transmitter.

It should be understood that, after the transmitter collects the first data via the first sensor, because the transmitter needs to send the first data to the receiver (for example, a server) via an Ethernet, the transmitter needs to encapsulate the first data into an Ethernet data packet that can be transmitted on the Ethernet (Ethernet). In this embodiment, the Ethernet data packet obtained by encapsulating the first data is referred to as the first Ethernet data packet.

Figures 3, 4:
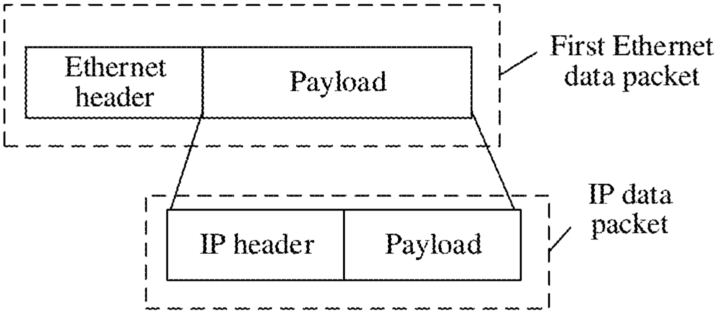
FIG. 3 is a diagram of a structure of a first Ethernet data packet according to an embodiment of this application.
FIG. 4 is a diagram of a structure of a first data table according to an embodiment.

For example, FIG. 3 is a diagram of a structure of generating the first Ethernet data packet by the transmitter. As shown in FIG. 3, an IP data packet is first generated by encapsulating an internet protocol address (internet protocol address, IP) header of the collected first data, then the IP data packet is used as a payload, and the first Ethernet data packet is generated by adding an Ethernet header. It should be understood that, in addition to the first data, the payload in the IP data packet in this embodiment further includes some encapsulation header information that exists before IP encapsulation is performed. For more detailed implementation of how to encapsulate data into an Ethernet data packet, refer to descriptions in a related technology. Details are not described herein again.

It should be understood that, after the first data is encapsulated into the first Ethernet data packet, the first Ethernet data packet carries first identification information of a first sensor and the first data.

In an example, the first identification information of the first sensor is a media access control (media access control, MAC) source address.

S202: The transmitter determines second identification information of the first sensor that has a preset mapping relationship with the first identification information of the first sensor, where the preset mapping relationship includes a correspondence between first identification information of a sensor and second identification information of the sensor.

It may be understood that the first identification information of the first sensor generally includes a large quantity of bits. Therefore, in this embodiment, after the first identification information of the first sensor is obtained, the second identification information of the first sensor that corresponds to the first identification information is obtained by using the preset mapping relationship. The second identification information uses fewer bits than the first identification information.

In a possible implementation, the preset mapping relationship between the first identification information and the second identification information that are used to identify the first sensor may be first established, and then after the first identification information is identified, the second identification information corresponding to the first identification information may be found based on the preset mapping relationship.

For example, it is assumed that the first identification information of the first sensor in the first Ethernet data packet is a MAC source address, and the MAC source address is 00:14:00:82:3A:41. In the preset mapping relationship, the first sensor may also be distinguished from a sensor of another type by using a number 1, in other words, a mapping relationship between 00:14:00:82:3A:41 and the number 1 may be established. In this case, the transmitter may determine that the second identification information of the first sensor that has the preset mapping relationship with 00:14:00:82:3A:41 of the first sensor is 1.

S203: If a first target Ethernet data packet corresponding to the second identification information of the first sensor exists in a first data table, the transmitter determines target deviation information between the first Ethernet data packet and the first target Ethernet data packet, where the first data table includes a correspondence among second identification information of a sensor, an Ethernet data packet, and packet identification information of the Ethernet data packet, and the first target Ethernet data packet carries the first identification information of the first sensor and second data collected by the first sensor.

The second data is data collected by the first sensor. In other words, both the first data and the second data are data collected by the first sensor. More specifically, the second data may be considered as data collected by the first sensor before the first sensor collects the first data, that is, the second data is historical data.

In this embodiment, the first target Ethernet data packet is an Ethernet data packet generated based on the second data. It may be understood that the first target Ethernet data packet may also be considered as an Ethernet data packet historically generated by the transmitter.

In this embodiment, the first data table includes the correspondence among second identification information of a sensor, an Ethernet data packet, and packet identification information of the Ethernet data packet. For example, FIG. 4 is a diagram of a structure of the first data table according to this embodiment. As shown in FIG. 4, the figure provides an example of correspondences among second identification information of two sensors, Ethernet data packets, and packet identification information of the Ethernet data packets. For example, for a sensor whose second identification information is 1, Ethernet data packets corresponding to the sensor include an Ethernet data packet whose packet identification information is 1 and an Ethernet data packet whose packet identification information is 2. For a sensor whose second identification information is 2, an Ethernet data packet corresponding to the sensor includes only Ethernet data whose packet identification information is 1.

Therefore, in this embodiment, after determining the second identification information of the first sensor, the transmitter may determine whether an Ethernet data packet corresponding to the second identification information of the first sensor exists in the first data table. FIG. 4 is used as an example. Assuming that the transmitter determines, by performing S202, that the second identification information of the first sensor is 3, no Ethernet data packet corresponding to the second identification information of the first sensor exists in the first data table. If the transmitter determines, by performing S202, that the second identification information of the first sensor is 2, the Ethernet data packet corresponding to the second identification information of the first sensor exists in the first data table, in other words, the first target Ethernet data packet exists.

It should be understood that the second identification information of the first sensor may correspond to K target Ethernet data packets, in other words, the first target Ethernet data packet is one of the K target Ethernet data packets, and the K target Ethernet data packets are in one-to-one correspondence with K pieces of packet identification information. K is less than or equal to M, and M is a preset upper limit value of a quantity of target Ethernet data packets corresponding to the second identification information of the first sensor.

It should be understood that, when the second identification information of the first sensor may correspond to the K target Ethernet data packets, a possible implementation of selecting the first target Ethernet data packet includes: determining K pieces of deviation information of the first Ethernet data packet that respectively correspond to the K target Ethernet data packets; and determining, as the first target Ethernet data packet, a target Ethernet data packet corresponding to smallest deviation information in the K pieces of deviation information.

It should be understood that, when the second identification information of the first sensor may correspond to the K target Ethernet data packets, another possible implementation of selecting the first target Ethernet data packet includes: performing differentiation starting from a target Ethernet data packet that is newly/initially added, where once a differentiation result between the first Ethernet data packet and a target Ethernet data packet and a preset threshold meet a preset condition, the target Ethernet data packet is selected as the first target Ethernet data packet.

In this embodiment, when the first target Ethernet data packet (which is also referred to as a reference data packet or referred to as a base used for compression in this embodiment) corresponding to the second identification information of the first sensor exists in the first data table, the target deviation information between the first Ethernet data packet and the first target Ethernet data packet is further determined.

For example, in a possible implementation, the target deviation information may be obtained by performing an exclusive OR operation on a bit value included in the first Ethernet data packet and a bit value included in the first target Ethernet data packet. For example, as shown in Table 1, it is assumed that content of the first Ethernet data packet is 0101111111111111111111111111111111110000000000001111 1, and content of the first target Ethernet data packet is 0101111111111011111111110111111111000000000000011101. In this case, after the exclusive OR operation is performed on the first Ethernet data packet and the first target Ethernet data packet, the obtained target deviation information is 000000000000010000000000100000000010000000000000
0010. It can be learned that, in the target deviation information, a position whose bit value is 1 indicates that the content of the first Ethernet data packet and the content of the first target Ethernet data packet are different at the position.

TABLE 1

| | |
|---|---|
| First Ethernet data packet | 0101111111111111111111111111111111110000000000001111 1 |
| First target Ethernet data packet | 0101111111111011111111110111111111000000000000011101 |
| Target deviation information | 0000000000000100000000001000000000100000000000000010 |

It may be understood that, when the second identification information of the first sensor may correspond to the K target Ethernet data packets, after the target Ethernet data packet corresponding to the smallest deviation information in the K pieces of deviation information is determined as the first target Ethernet data packet, the target deviation information between the first Ethernet data packet and the first target Ethernet data packet is deviation information between the first Ethernet data packet and the target Ethernet data packet corresponding to the smallest deviation information.

S204: The transmitter compresses the target deviation information by using a preset coding algorithm to obtain target coding deviation information.

In this embodiment, after the target deviation information between the first Ethernet data packet and the first target Ethernet data packet that is stored in the first data table is obtained, the target deviation information is further compressed by using a preset coding method, to obtain the target coding deviation information used during transmission. It may be understood that the target coding deviation information is compressed information. More specifically, the target coding deviation information is information obtained by compressing an entire first Ethernet data packet.

For example, the preset coding algorithm may be a sparse coding method, a run-length coding compression method, a sparse matrix compression method, or the like. For a detailed implementation process of each coding algorithm, refer to descriptions in a related technology. Details are not described herein again.

S205: The transmitter obtains packet identification information of the first target Ethernet data packet from the first data table.

In this embodiment, when determining that the first target Ethernet data packet exists in the first data table, the transmitter further obtains the packet identification information of the first target Ethernet data packet.

FIG. 4 is used as an example. In an example, assuming that a second identifier of the first sensor is 2, the first target Ethernet data packet exists in the first data table. Further, it may be obtained that a packet identifier of the first target Ethernet data packet is 1.

FIG. 4 is used as an example. In another example, assuming that a second identifier of the first sensor is 1, the first data table includes two Ethernet data packets. After a differential operation is performed on the first Ethernet data packet and the two Ethernet data packets whose second identification information is 1 in the first data table, the packet identification information of the first target Ethernet data packet is packet identification information corresponding to an Ethernet data packet with the smallest deviation information.

S206: The transmitter sends first information, where the first information includes first indication information and the target coding deviation information, and the first indication information indicates at least one of the following information: the target coding deviation information being compressed information, the second identification information of the first sensor, and the packet identification information of the first target Ethernet data packet. Correspondingly, the receiver receives the first information.

In this embodiment, after determining that the first target Ethernet data packet exists in the first data table and determining the target coding deviation information between the first Ethernet data packet and the first target Ethernet data packet, when sending information to the receiver, the transmitter no longer directly send the first Ethernet data packet but sends the compressed target coding deviation information. In addition, to enable the receiver to restore the first Ethernet data packet by using the target coding deviation information, the first indication information is further sent. The first indication information indicates that the target coding deviation information is compressed information, and indicates the second identification information of the sensor and the packet identification information of the first target Ethernet data packet. In this case, the receiver can directly determine, from a second data table of the receiver, a target Ethernet data packet used when the first Ethernet data packet is restored by using the target coding deviation information.

S207: The receiver obtains, from the second data table, the first target Ethernet data packet corresponding to the second identification information of the first sensor and the packet identification information of the first target Ethernet data packet, where the second data table includes the correspondence among second identification information of a sensor, an Ethernet data packet, and packet identification information of the Ethernet data packet.

The second data table includes the correspondence, included in the first data table, among second identification information of a sensor, an Ethernet data packet, and packet identification information of the Ethernet data packet. It should be understood that a plurality of transmitters may correspond to a same receiver in a communication case. Therefore, correspondences, included in the second data table, among second identification information of sensors, Ethernet data packets, and packet identification information of the Ethernet data packets may be more than correspondences, included in the first data table, among second identification information of sensors, Ethernet data packets, and packet identification information of the Ethernet data packets.

In this embodiment, after receiving the first information, the receiver first parses the first indication information in the first information. If it is found that the second identification information of the first sensor and the packet identification information of the first target Ethernet data packet exist in the second data table, the first target Ethernet data packet corresponding to the second identification information of the first sensor and the packet identification information of the first target Ethernet data packet is obtained.

S208: The receiver decodes the target coding deviation information by using a preset decoding algorithm to obtain the target deviation information, where the target deviation information indicates deviation information between the first Ethernet data packet and the first target Ethernet data packet, and the first Ethernet data packet carries the first identification information of the first sensor and/or the first data collected by the first sensor.

In this embodiment, the target coding deviation information in the first information is compressed information. More specifically, the target coding deviation information in the first information is obtained by performing differential calculation on the first Ethernet data packet and the first target Ethernet data packet to obtain the target deviation information, and then compressing the target deviation information by using the preset coding algorithm. Therefore, after receiving the first information, the receiver first decodes the target coding deviation information in the first information by using the preset decoding algorithm, to obtain the deviation information between the first Ethernet data packet and the first target Ethernet data packet.

It should be understood that in this embodiment, the preset decoding algorithm corresponds to the preset coding algorithm. In other words, when a piece of information is encoded by using a preset coding algorithm to obtain encoded information, the encoded information needs to be decoded by using a decoding algorithm corresponding to the coding algorithm, to obtain the encoded information.

S209: Restore the first Ethernet data packet based on the first target Ethernet data packet and the target deviation information.

In a possible implementation, when the transmitter performs the exclusive OR operation on the bit value included in the first Ethernet data packet and the bit value included in the first target Ethernet data packet to obtain the target deviation information, the receiver may perform the exclusive OR operation on a bit value included in the target deviation information and the bit value included in the first target Ethernet data packet to obtain the first Ethernet data packet, to restore the complete first Ethernet data packet based on the first target Ethernet data packet (reference data packet) and the target deviation information.

In the information processing method provided in this embodiment of this application, when the first target Ethernet data packet corresponding to the second identification information of the first sensor exists in the first data table, the first target Ethernet data packet is used as the reference data packet (which is also referred to as a base for compression). Then, the first Ethernet data packet generated based on the first data subsequently collected by the first sensor is differentiated from the reference data packet to obtain the deviation information, and the deviation information is compressed by using the preset coding algorithm to obtain compressed information for transmission. Finally, packet identification information corresponding to the reference data packet, the second identification information of the first sensor, and the compressed information are transmitted to the receiver. Correspondingly, after obtaining the packet identification information corresponding to the reference data packet, the second identification information of the first sensor, and the compressed information that are sent by the transmitter, the receiver first decodes the compressed information by using the preset decoding algorithm to obtain the deviation information between the first Ethernet data packet and the reference data packet, then obtains the reference data packet based on the packet identification information of the reference data packet and the second identification information of the first sensor that are sent by the transmitter, and finally restores the first Ethernet data packet based on the reference data packet and the deviation information.

It may be understood that the information processing method provided in this embodiment of this application is a method for compressing an Ethernet data packet based on a static data table. Compared with an uplink data compression (uplink data compression, UDC) method, in the method provided in this embodiment of this application, a dynamic buffer does not need to be maintained at the transmitter and the receiver, and therefore, compression of a subsequent Ethernet data packet does not depend on a previously successfully decompressed data packet, so that reliability is improved. In addition, because existing UDC uses a sliding window manner during compression, a delay during compression is high. However, in this embodiment of this application, during compression, the subsequently generated Ethernet data packet is directly differentiated from the existing reference data packet, and then compression is performed by using an existing coding manner. Therefore, compared with the UDC, during the compression in this embodiment of this application, a delay is also reduced. In addition, compared with a method for compressing an Ethernet header, the method provided in this application can compress the entire Ethernet data packet. However, the method for compressing the Ethernet header can compress only the Ethernet header. Therefore, compared with the method for compressing the Ethernet header, in the method provided in this application, the delay is also reduced.

Figure 5:
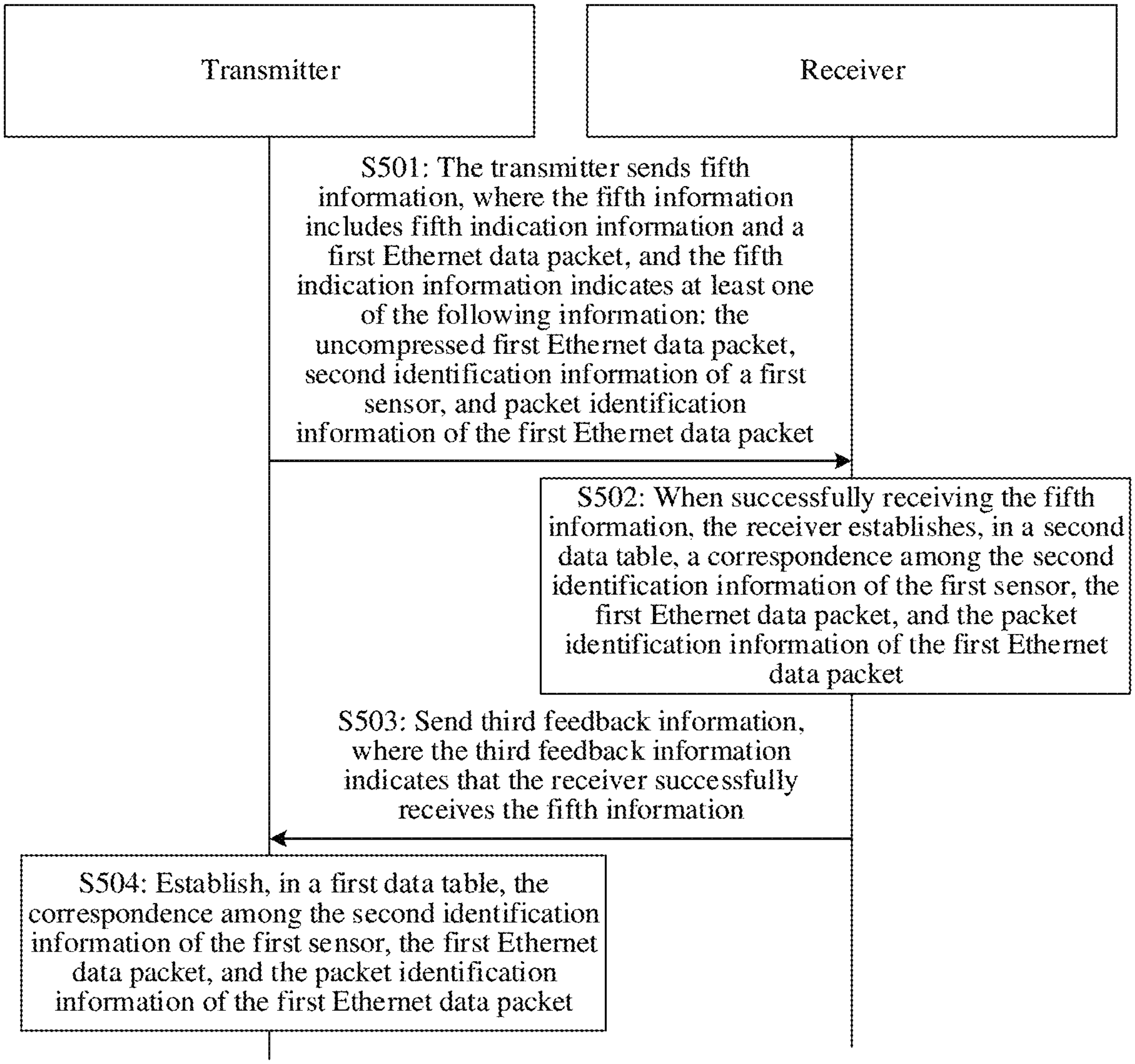
FIG. 5 is a schematic flowchart of an information processing method according to another embodiment of this application.

Optionally, in this embodiment of this application, the first target Ethernet data packet corresponding to the second identification information of the first sensor may not exist in the first data table. With reference to FIG. 5, the following describes an information processing method according to an embodiment of this application when no first target Ethernet data packet corresponding to second identification information of a first sensor exists in a first data table.

As shown in FIG. 5, the information processing method in this embodiment includes S501, S502, S503, and S504.

S501: A transmitter sends fifth information, where the fifth information includes fifth indication information and a first Ethernet data packet, and the fifth indication information indicates at least one of the following information: the uncompressed first Ethernet data packet, the second identification information of the first sensor, and packet identification information of the first Ethernet data packet.

When no first target Ethernet data packet exists in the first data table, it indicates that there is no reference data packet that can be used to compress the first Ethernet data packet. In this case, the transmitter in this embodiment sends the entire first Ethernet data packet, and further sends the fifth indication information. The fifth indication information indicates that the sent first Ethernet data packet is uncompressed information, and indicates the packet identification information of the first Ethernet data packet and the second identification information of the first sensor that are used to store the first Ethernet data packet in the first data table or a second data table.

S502: When successfully receiving the fifth information, a receiver establishes, in the second data table, a correspondence among the second identification information of the first sensor, the first Ethernet data packet, and the packet identification information of the first Ethernet data packet.

In this embodiment, after the transmitter sends the fifth information to the receiver, if transmission succeeds, the receiver may successfully receive the fifth information.

In this embodiment, after successfully receiving the fifth information, the receiver can establish, in the second data table, the correspondence among the second identification information of the first sensor, the first Ethernet data packet, and the packet identification information of the first Ethernet data packet based on the second identification information of the first sensor and the packet identification information of the first Ethernet data packet that are indicated in the fifth indication information.

S503: The receiver sends third feedback information to the transmitter, where the third feedback information indicates that the receiver successfully receives the fifth information. Correspondingly, the transmitter receives the third feedback information.

In this embodiment, after establishing, in the second data table, the correspondence among the second identification information of the first sensor, the first Ethernet data packet, and the packet identification information of the first Ethernet data packet, the receiver further sends, to the transmitter, feedback information (namely, the third feedback information) indicating that the receiver successfully receives the fifth information.

In an implementation, the third feedback information may be similar to an acknowledgment (ACK) message in transmission control protocol (Transmission Control Protocol, TCP) transmission. This does not constitute a limitation on this application.

In another implementation, the third feedback information may alternatively be one or more of packet identification information and second identification information that correspond to a sensor.

S504: Establish, in the first data table, the correspondence among the second identification information of the first sensor, the first Ethernet data packet, and the packet identification information of the first Ethernet data packet.

In this embodiment, after receiving the third feedback information, the transmitter can determine that the receiver has successfully received the first Ethernet data packet. In this case, the transmitter also stores, in the first data table, the correspondence among the second identification information of the first sensor, the first Ethernet data packet, and the packet identification information of the first Ethernet data packet, to use the first Ethernet data packet as one of bases for compressing an Ethernet data packet generated based on data subsequently collected by the first sensor.

It should be noted that, after the transmitter sends the fifth information to the receiver, if transmission fails (for example, a packet loss occurs), in other words, the fifth information does not arrive at the receiver, it indicates that transmission of the first Ethernet data packet fails. In this case, the receiver does not store, in the second data table, the correspondence among the second identification information of the first sensor, the first Ethernet data packet, and the packet identification information of the first Ethernet data packet, and the transmitter does not receive the third feedback information sent by the receiver. Therefore, the first Ethernet data packet cannot be used as a base for compressing the Ethernet data packet generated based on the data subsequently collected by the first sensor.

In the method, when the first target Ethernet data packet corresponding to the second identification information of the first sensor does not exist in the first data table, the entire original Ethernet data packet (the first Ethernet data packet) is sent to the receiver, and indication information is further sent to indicate that the first Ethernet data packet is an uncompressed data packet, and indicate the second identification information of the first sensor and the packet identification information of the first Ethernet data packet, so that both the transmitter and the receiver establish the correspondence among the second identification information of the first sensor, the first Ethernet data packet, and the packet identification information of the first Ethernet data packet, to use the first Ethernet data packet as one of bases for compressing the Ethernet data packet generated based on the data subsequently collected by the first sensor.

Figure 6:
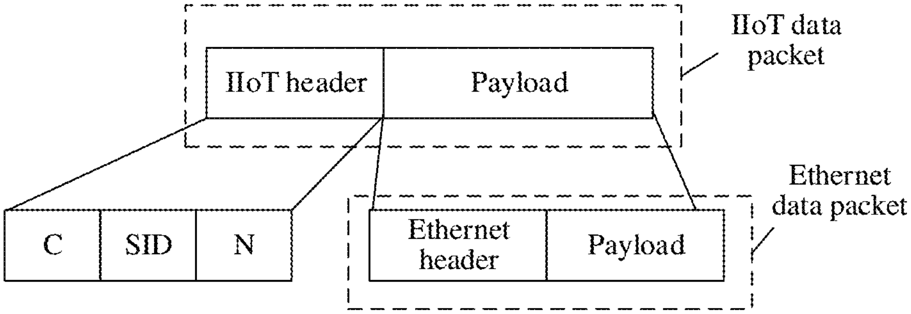
FIG. 6 is a diagram of a structure of an IIoT data packet.

It should be noted herein that, in this embodiment, the sent first information or fifth information is also referred to as an IIoT data packet. For ease of understanding, FIG. 6 is a diagram of a structure of the IIoT data packet. As shown in FIG. 6, the IIoT data packet includes an IIoT header and an IIoT payload. The IIoT payload includes first data collected by the first sensor, and the IIoT header includes three parts: C, SID, and N. C indicates whether the IIoT payload in the IIoT data packet is compressed information, the SID indicates the second identification information of the sensor, and N indicates packet identification information of an Ethernet data packet that has been stored in the first data table or a number (or a position) of an Ethernet data packet that is to be stored in the first data table. It can be learned that the IIoT header shown in FIG. 6 has a same function as the foregoing first indication information or fifth information. More specifically, specific implementations are as follows:

C: 0 and 1 may indicate whether an IIoT payload part is compressed. 0 indicates that the IIoT payload part is not compressed, and 1 indicates that the IIoT payload part is compressed. It should be understood that, if C is 0, after receiving succeeds, the receiver needs to send feedback information to the transmitter, and add an uncompressed Ethernet data packet to the second data table.

SID: The SID can be represented by using a type number corresponding to a sensor. It should be noted that, in this application, each sensor establishes a corresponding base in a data table (where for the transmitter, a corresponding base is established in the first data table, and for the receiver, a corresponding base is established in the second data table), and each sensor may have a plurality of base.

N: N indicates identification information of the base in the data table, in other words, indicates an $N^{th}$ base of the sensor in the data table. It should be understood that, if C is 0, the receiver uses the IIoT payload in the IIoT data packet as the $N^{th}$ base of the sensor indicated by the SID, and adds the IIoT payload to the data table. If C is 1, the receiver extracts, from the data table, the $N^{th}$ base of the sensor indicated by the SID, and differentiates the $N^{th}$ base from target deviation information to obtain original data.

IIoT payload: If C is 0, the IIoT payload is an original Ethernet data packet. If C is 1, the IIoT payload is target coding deviation information.

In the method provided in this embodiment, a specific format of the first information or the fifth information is specified. In this way, the receiver can identify, by parsing the IIoT header, the second identification information of the sensor corresponding to the IIoT data packet, and whether the IIoT payload part is the original Ethernet data packet or compressed target coding deviation information, and packet identification information, so that when the transmitter sends the original Ethernet data packet, the receiver can determine a position of a base added to the second data table; or when the transmitter sends the target coding deviation information, the receiver can determine, from the second data table, a base that needs to be used.

It may be understood that, when the method in FIG. 2 is performed, the transmitter and the receiver first need to cooperate, and both establish a data table locally, to store a first target Ethernet data packet that assists in compressing an Ethernet data packet generated based on data collected by each sensor. In this embodiment, the data table created at the transmitter is referred to as the first data table, and the data table created at the receiver is referred to as the second data table.

In an implementation solution, before S203 in the embodiment shown in FIG. 2 is performed, the method further includes: The transmitter generates the first target Ethernet data packet and sends second information, where the second information includes second indication information and the first target Ethernet data packet, and the second indication information indicates at least one of the following information: the uncompressed first target Ethernet data packet, the second identification information of the first sensor, and packet identification information of the first target Ethernet data packet. Correspondingly, the receiver receives the second information, establishes, in the second data table, a correspondence among the second identification information of the first sensor, the first target Ethernet data packet, and the packet identification information of the first target Ethernet data packet, and feeds back first feedback information to the transmitter, where the first feedback information indicates that the receiver successfully receives the second information. After receiving the first feedback information, the transmitter establishes, in the first data table, the correspondence among the second identification information of the first sensor, the first target Ethernet data packet, and the packet identification information of the first target Ethernet data packet.

It should be understood that if the first target Ethernet data packet (which is also referred to as a reference data packet or a base used for compression) in the first data table needs to be used to compress the first Ethernet data packet, the first target Ethernet data packet needs to be first stored in the first data table.

Specifically, in this embodiment, after generating the first target Ethernet data packet, when sending the first target Ethernet data packet to the receiver, the transmitter does not compress the first target Ethernet data packet, and directly sends the first target Ethernet data packet as a whole. In addition, to establish a data table at both the transmitter and the receiver, when sending the first target Ethernet data packet to the receiver, the transmitter further sends the second indication information. The second indication information indicates that the first target Ethernet data packet is an uncompressed data packet, and when the first target Ethernet data packet is stored in the data table (where for the transmitter, the first target Ethernet data packet is stored in the first data table, and for the receiver, the first target Ethernet data packet is stored in the second data table), the second indication information indicates second identification information of the sensor corresponding to the first target Ethernet data packet and the packet identification information corresponding to the first target Ethernet data packet.

It should be understood that, when the transmitter sends the second information to the receiver, there are two receiving cases for the receiver. One is that the receiver receives the second information, and the other is that the receiver receives no second information.

For the first receiving case, when receiving the second information, the receiver establishes, in the second data table, the correspondence among the second identification information of the first sensor, the first target Ethernet data packet, and the packet identification information of the first target Ethernet data packet, and then sends the first feedback information, where the first feedback information indicates that the receiver successfully receives the second information. Further, when receiving the first feedback information, the transmitter establishes, in the first data table, the correspondence among the second identification information of the first sensor, the first target Ethernet data packet, and the packet identification information of the first target Ethernet data packet. In this way, the first target Ethernet data packet is stored in both the first data table and the second data table. In addition, the first data table and the second data table further store the second identification information of the sensor and the packet identification information that correspond to the first target Ethernet data packet.

For the second receiving case, when the receiver receives no second information, in other words, the second information does not arrive at the receiver (for example, when a packet loss occurs in the second information, the second information does not arrive at the receiver), it indicates that transmission of the first target Ethernet data packet fails. In this case, the receiver does not store, in the second data table, the correspondence among the second identification information of the first sensor, the first Ethernet data packet, and the packet identification information of the first Ethernet data packet, and the transmitter receives no first feedback information sent by the receiver.

In this embodiment, when the transmitter receives no first feedback information, the transmitter sends third information, where the third information includes third indication information and a second Ethernet data packet, and the third indication information indicates at least one of the following information: the uncompressed second Ethernet data packet, the second identification information of the first sensor, and packet identification information of the second Ethernet data packet. The second Ethernet data packet carries the first identification information of the first sensor and third data collected by the first sensor. If the receiver receives the third information, the receiver establishes, in the second data table, the correspondence among the second identification information of the first sensor, the first target Ethernet data packet, and the packet identification information of the first target Ethernet data packet. The first target Ethernet data packet is the second Ethernet data packet, and the identification information of the first target Ethernet data packet is the packet identification information of the second Ethernet data packet. Then, the receiver sends second feedback information, where the second feedback information indicates that the receiver successfully receives the third information. Finally, after receiving the second feedback information, the transmitter establishes, in the first data table, the correspondence among the second identification information of the first sensor, the first target Ethernet data packet, and the packet identification information of the first target Ethernet data packet. Specifically, the first target Ethernet data packet is the second Ethernet data packet, and the identification information of the first target Ethernet data packet is the packet identification information of the second Ethernet data packet. In this way, the first target Ethernet data packet (the second Ethernet data packet) is stored in both the first data table and the second data table. In addition, the first data table and the second data table further store the second identification information of the sensor and the packet identification information that correspond to the second Ethernet data packet.

It should be noted herein that a specific scenario in which the second information is sent is not limited in this embodiment of this application.

For example, in a possible implementable, when no target Ethernet data packet corresponding to the second identification information of the first sensor exists in the first data table and the second data table, the second information is sent. It may be understood that, in this implementation, it may be considered that the first target Ethernet data packet is newly added or created in the first data table and the second data table.

Figure 7B:
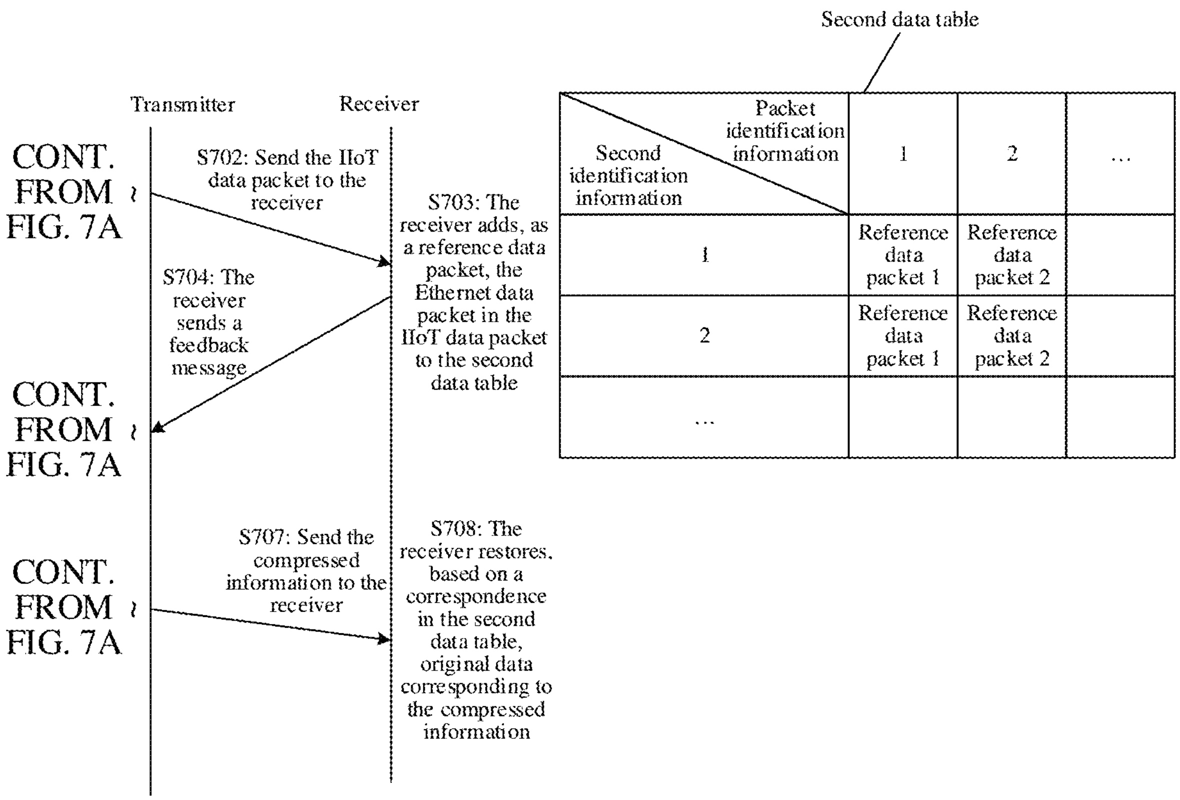

For ease of understanding, FIG. 7A and FIG. 7B are a diagram of a structure of creating reference data packets in data tables at a receiver and a transmitter according to an embodiment of this application. In this embodiment, it is assumed that each sensor may include a maximum of M reference data packets, where M is greater than or equal to 1, and there are a total of K sensors. Therefore, a first data table and a second data table each are a table with K+1 rows and M+1 columns. It is assumed that a $1^{st}$ column of the first data table and the second data table represents a sequence number of a corresponding sensor, and each sequence number represents a type of sensor, for example, a temperature sensor or a humidity sensor. In this case, a process in which a sensor creates reference data packets in the first data table and the second data table is as follows:

1. The first data table and the second data table are initialized.
2. The sensor starts to collect data. If no corresponding reference data packet is found in the first data table for an Ethernet data packet generated at a current moment, the Ethernet data packet generated based on data at the current moment is used as a load part of an IIoT data packet, and a corresponding IIoT header is added to generate a complete IIoT data packet (as shown in S701 in FIG. 7A).
3. The IIoT data packet is sent to a receiver side (as shown in S702 in FIG. 7B).
4. (a) When successfully receiving the IIoT data packet, the receiver adds, as the reference data packet, the Ethernet data packet in the load part of the IIoT data packet to the second data table (as shown in S703 in FIG. 7B), and sends, to the transmitter, a feedback message indicating successful receiving (as shown in S704 in FIG. 7B). After receiving the feedback message, the transmitter also adds the Ethernet data packet to the first data table (as shown in S705 in FIG. 7A).

(b) However, when the receiver fails to receive the IIoT data packet or an error occurs during decompression, the data packet is invalid and is discarded. In this case, the transmitter receives no feedback message, and therefore does not add the Ethernet data packet to the first data table. The transmitter continues to transmit, to the receiver side as the reference data packet, an Ethernet data packet generated based on data collected by the sensor at a subsequent moment, repeats the behavior until the feedback message sent by the receiver side is received, and adds a successfully transmitted Ethernet data packet to the first data table.

S706, S707, and S708 in FIG. 7A and FIG. 7B may be performed for an Ethernet data packet generated based on data subsequently collected by the sensor. To be specific, a reference data packet that is suitable for compressing an Ethernet data packet generated by the sensor at a next moment is selected from the first data table, to generate compressed information (as shown in S706 in FIG. 7A). The compressed information is sent to the receiver (as shown in S707 in FIG. 7B). Then, after receiving the compressed information, the receiver restores, based on a correspondence in the second data table, original data corresponding to the compressed information (as shown in S708 in FIG. 7B).

For example, in another possible implementation, if J target Ethernet data packets corresponding to the second identification information of the first sensor exist in the first data table, J pieces of deviation information of the first target Ethernet data packet that correspond to the J target Ethernet data packets are obtained, where J is less than M. The second information is sent when a ratio of a quantity of bit values that are target values and that are included in any one of the J pieces of deviation information to a total quantity of bits corresponding to the any piece of deviation information and a first preset threshold meet a preset condition. The target value includes 0 or 1, and the preset condition includes:

when the target value is 0, a ratio of a quantity of bit values that are 0 and that are included in any one of the J pieces of deviation information to a total quantity of bits corresponding to the any piece of deviation information is less than the first preset threshold; or when the target value is 1, a ratio of a quantity of bit values that are 1 and that are included in any one of the J pieces of deviation information to a total quantity of bits corresponding to the any piece of deviation information is greater than the first preset threshold.

In this embodiment, when the reference data packet exists in the first data table and a quantity of reference data packets that exist in the first data table does not reach a preset upper limit value M of the quantity of reference data packets, the generated first target Ethernet data packet and each reference data packet that exists in the first data table are first calculated for deviation information. Then, in all the calculated deviation information, if a ratio of a quantity of bit values that are target values and that are included in any piece of the deviation information to a total quantity of bits and the first preset threshold (for example, a specified threshold a) meet the preset condition, for example, when the ratio of the quantity of bit values that are 0 and that are included in the any one of the J pieces of deviation information to the total quantity of bits corresponding to the any piece of deviation information is less than the first preset threshold, or when the target value is 1, and the ratio of the quantity of bit values that are 1 and that are included in the any one of the J pieces of deviation information to the total quantity of bits corresponding to the any piece of deviation information is greater than the first preset threshold, it is considered that the existing reference data packet of the sensor is insufficient to provide specified compression efficiency. Therefore, the first target Ethernet data packet of the sensor is sent to the receiver as the reference data packet, and the first target Ethernet data packet is separately added to the first data table and the second data table.

It may be understood that, when a first target reference data packet is sent according to principles of this implementation, because the transmitter differentiates the generated first target Ethernet data packet from all reference data packets in the first data table, when compressing a subsequently generated Ethernet data packet, the transmitter can ensure that a used reference data packet has a best compression rate.

For example, in still another possible implementation, sending the second information includes: if M target Ethernet data packets corresponding to the second identification information of the first sensor exist in the first data table, obtaining M pieces of deviation information of the first target Ethernet data packet that respectively correspond to the M target Ethernet data packets; and sending the second information when a ratio of a quantity of bit values that are target values and that are included in any one of the M pieces of deviation information to a total quantity of bits corresponding to the any piece of deviation information and a second preset threshold meet a preset condition, where the target value includes 0 or 1, and the preset condition includes: when the target value is 0, a ratio of a quantity of bit values that are 0 and that are included in any one of the J pieces of deviation information to a total quantity of bits corresponding to the any piece of deviation information is less than the second preset threshold; or when the target value is 1, a ratio of a quantity of bit values that are 1 and that are included in any one of the J pieces of deviation information to a total quantity of bits corresponding to the any piece of deviation information is greater than the second preset threshold. Correspondingly, establishing, in the first data table after the first feedback information is received, the correspondence among the second identification information of the first sensor, the first target Ethernet data packet, and the packet identification information of the first target Ethernet data packet includes: after the first feedback information is received, when a correspondence among the second identification information of the first sensor, an $i^{th}$ Ethernet data packet, and packet identification information of the $i^{th}$ Ethernet data packet is deleted from the first data table, establishing, in the first data table, the correspondence among the second identification information of the first sensor, the first target Ethernet data packet, and the packet identification information of the first target Ethernet data packet, where the $i^{th}$ Ethernet data packet is a target Ethernet data packet that is in the M target Ethernet data packets and that corresponds to a maximum ratio in the deviation information between the target Ethernet data packet and the first target Ethernet data packet.

In this implementation, after the transmitter generates the first target Ethernet data packet, even if the M target Ethernet data packets (where a quantity of included target Ethernet data packets reaches an upper limit value M that is set for the first sensor) corresponding to the second identification information of the first sensor exist in the first data table, after the transmitter calculates the M pieces of deviation information of the first target Ethernet data packet that correspond to the M target Ethernet data packets, if the ratio of the quantity of bit values that are the target value and that are included in the any one of the M pieces of deviation information to the total quantity of bits corresponding to the any piece of deviation information and the second threshold meet the preset condition, for example, when the ratio of the quantity of bit values that are 0 and that are included in the any one of the M pieces of deviation information to the total quantity of bits corresponding to the any piece of deviation information is less than the second preset threshold, or when the target value is 1, and the ratio of the quantity of bit values that are 1 and that are included in the any one of the J pieces of deviation information to the total quantity of bits corresponding to the any piece of deviation information is greater than the first preset threshold, the transmitter does not use any one of the M target Ethernet data packets to compress the first target Ethernet data, but still sends the first target Ethernet data packet as an uncompressed data packet. Then, after the feedback information of the receiver is received, a target Ethernet data packet that is in the M target Ethernet data packets and that corresponds to a maximum ratio in the deviation information between the target Ethernet data packet and the first target Ethernet data packet is first deleted, and then the correspondence among the second identification information of the first sensor, the first target Ethernet data packet, and the packet identification information of the first target Ethernet data packet is established in the first data table. It may be understood that, when the reference data packet is stored in the first data table in this manner, a compression effect is improved.

Optionally, after receiving the first feedback information, the transmitter may further send fourth information to the receiver when the correspondence among the second identification information of the first sensor, an $i^{th}$ Ethernet data packet, and packet identification information of the $i^{th}$ Ethernet data packet is deleted from the first data table. The fourth information indicates to delete the correspondence among the second identification information of the first sensor, an $i^{th}$ Ethernet data packet, and packet identification information of the $i^{th}$ Ethernet data packet.

In this implementation, when the M target Ethernet data packets corresponding to the second identification information of the first sensor exist in the first data table, if the transmitter deletes the previously stored correspondence among the second identification information of the first sensor, an $i^{th}$ Ethernet data packet, and packet identification information of the $i^{th}$ Ethernet data packet, the transmitter further sends indication information to the receiver, to indicate the deleted correspondence to the receiver.

It should be noted herein that, using of any base used for compressing an entire Ethernet data packet should belong to the concept of this embodiment of this application.

For example, it is possible that one transmitter can send data to only one receiver, and one receiver can only receive data sent by one transmitter (in other words, it may be considered that second identification information of a sensor has been preset). On this basis, there may be a scenario in which a base used for compression has been preset by the transmitter and the receiver. In this case, a correspondence among the second identification information of the sensor, an Ethernet data packet, and packet identifier of the Ethernet data packet in this application may be considered as that the first data table includes the Ethernet data packet. Further, the embodiment shown in FIG. 2 may not include S202 or S205, and the first information sent by the transmitter may only indicate that the target coding deviation information is compressed information. Correspondingly, for the receiver, that the second data table includes a correspondence among second identification information of a sensor, an Ethernet data packet, and packet identification information of the Ethernet data packet may be considered as that the first data table includes the Ethernet data packet. Further, when receiving an indication that only indicates that the target coding deviation information is compressed information, the receiver may directly restore, based on a preset base, data sent by the transmitter, without performing S207 in the embodiment shown in FIG. 2.

For example, there may be a scenario in which one receiver may receive data sent by a plurality of transmitters, and only one Ethernet data packet is set for each transmitter. In this case, in this embodiment, the correspondence, included in the first data table, among second identification information of a sensor, an Ethernet data packet, and a packet identifier of Ethernet data packet may be considered as that the first data table includes a correspondence between the second identification information of the sensor and the Ethernet data packet. Further, the embodiment shown in FIG. 2 may not include step S205. Correspondingly, the first indication information in this step may indicate that the target coding deviation information is compressed information, and indicate the second identification information of the first sensor. Correspondingly, for the receiver, that the second data table includes the correspondence among second identification information of a sensor, an Ethernet data packet, and packet identification information of the Ethernet data packet may be considered as that the second data table includes a correspondence between the second identification information of the sensor and the Ethernet data packet. Further, when receiving an indication that indicates that the target coding deviation information is compressed information and indicates the second identification information of the first sensor, the receiver may first obtain, based on the second identification information of the first sensor, a base used for compression, to restore data sent by the transmitter.

The solutions provided in embodiments of this application are mainly described above from a perspective of interaction between the devices. It may be understood that, to implement the foregoing functions, each device includes a corresponding hardware structure and/or a corresponding software module for performing each function. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of each device may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
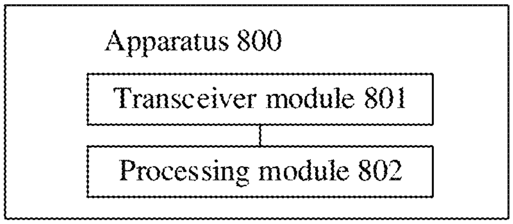
FIG. 8 is a diagram of a structure of an information processing apparatus according to an embodiment of this application.

When each functional module is obtained through division based on each corresponding function, FIG. 8 is a diagram of a structure of an information processing apparatus according to an embodiment of this application. As shown in FIG. 8, the communication apparatus 800 includes a transceiver module 801 and a processing module 802.

In a first embodiment, the apparatus 800 is used in a transmitter.

The processing module 802 is configured to generate a first Ethernet data packet. The first Ethernet data packet carries first identification information of a first sensor and/or first data collected by the first sensor. The processing module 802 is further configured to determine second identification information of the first sensor that has a preset mapping relationship with the first identification information of the first sensor. The preset mapping relationship includes a correspondence between the first identification information of the sensor and the second identification information of the sensor. The processing module 802 is further configured to: if a first target Ethernet data packet corresponding to the second identification information of the first sensor exists in a first data table, determine target deviation information between the first Ethernet data packet and the first target Ethernet data packet. The first data table includes a correspondence among the second identification information of the sensor, an Ethernet data packet, and packet identification information of the Ethernet data packet. The first target Ethernet data packet carries the first identification information and second data collected by the first sensor. The processing module 802 is further configured to compress the target deviation information by using a preset coding algorithm to obtain target coding deviation information. The processing module 802 is further configured to obtain packet identification information of the first target Ethernet data packet from the first data table. The transceiver module 801 is configured to send first information. The first information includes first indication information and/or the target coding deviation information. The first indication information indicates at least one of the following information: the target coding deviation information being compressed information, the second identification information of the first sensor, and the packet identification information of the first target Ethernet data packet.

In a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

In a possible implementation, the processing module 802 is further configured to: determine K pieces of deviation information of the first Ethernet data packet that respectively correspond to the K target Ethernet data packets; and determine, as the first target Ethernet data packet, a target Ethernet data packet corresponding to smallest deviation information in the K pieces of deviation information. Correspondingly, the processing module 802 is further configured to determine, as the target deviation information between the first Ethernet data packet and the first target Ethernet data packet, deviation information between the first Ethernet data packet and the target Ethernet data packet corresponding to the smallest deviation information.

In a possible implementation, the processing module 802 is further configured to generate the first target Ethernet data packet. The transceiver module 801 is further configured to send second information. The second information includes second indication information and the first target Ethernet data packet. The second indication information indicates at least one of the following information: the uncompressed first target Ethernet data packet, the second identification information of the first sensor, and the packet identification information of the first target Ethernet data packet. The processing module 802 is further configured to: after first feedback information is received, establish, in the first data table, a correspondence among the second identification information of the first sensor, the first target Ethernet data packet, and the packet identification information of the first target Ethernet data packet. The first feedback information indicates that the receiver successfully receives the second information.

In a possible implementation, the transceiver module 801 is specifically configured to: send the second information when no target Ethernet data packet corresponding to the second identification information of the first sensor exists in the first data table.

In a possible implementation, the processing module 802 is specifically configured to: if J target Ethernet data packets corresponding to the second identification information of the first sensor exist in the first data table, obtain J pieces of deviation information of the first target Ethernet data packet that correspond to the J target Ethernet data packets. J is less than M. The transceiver module 801 is specifically configured to: send the second information when a ratio of a quantity of bit values that are target values and that are included in any one of the J pieces of deviation information to a total quantity of bits corresponding to the any piece of deviation information and a first preset threshold meet a preset condition. The target value includes 0 or 1. The preset condition includes: when the target value is 0, a ratio of a quantity of bit values that are 0 and that are included in any one of the J pieces of deviation information to a total quantity of bits corresponding to the any piece of deviation information is less than the first preset threshold; or when the target value is 1, a ratio of a quantity of bit values that are 1 and that are included in any one of the J pieces of deviation information to a total quantity of bits corresponding to the any piece of deviation information is greater than the first preset threshold.

In a possible implementation, the processing module 802 is specifically configured to: if M target Ethernet data packets corresponding to the second identification information of the first sensor exist in the first data table, obtain M pieces of deviation information of the first target Ethernet data packet that respectively correspond to the M target Ethernet data packets. The transceiver module 801 is specifically configured to: send the second information when a ratio of a quantity of bit values that are target values and that are included in any one of the M pieces of deviation information to a total quantity of bits corresponding to the any piece of deviation information and a second preset threshold meet a preset condition. The target value includes 0 or 1. The preset condition includes: when the target value is 0, a ratio of a quantity of bit values that are 0 and that are included in any one of the J pieces of deviation information to a total quantity of bits corresponding to the any piece of deviation information is less than the second preset threshold; or when the target value is 1, a ratio of a quantity of bit values that are 1 and that are included in any one of the J pieces of deviation information to a total quantity of bits corresponding to the any piece of deviation information is greater than the second preset threshold. Correspondingly, the processing module 802 is further configured to: after the first feedback information is received, when a correspondence among the second identification information of the first sensor, an $i^{th}$ Ethernet data packet, and packet identification information of the $i^{th}$ Ethernet data packet is deleted from the first data table, establish, in the first data table, the correspondence among the second identification information of the first sensor, the first target Ethernet data packet, and the packet identification information of the first target Ethernet data packet. The $i^{th}$ Ethernet data packet is a target Ethernet data packet that is in the M target Ethernet data packets and that corresponds to a maximum ratio in the deviation information between the target Ethernet data packets and the first target Ethernet data packet.

In a possible implementation, the transceiver module 801 is further configured to send fourth information. The fourth information indicates to delete the correspondence among the second identification information of the first sensor, an $i^{th}$ Ethernet data packet, and the packet identification information of the $i^{th}$ Ethernet data packet.

In a possible implementation, the transceiver module 801 is further configured to: send third information when the first feedback information is not received. The third information includes third indication information and a second Ethernet data packet. The third indication information indicates at least one of the following information: the uncompressed second Ethernet data packet, the second identification information of the first sensor, and packet identification information of the second Ethernet data packet. The second Ethernet data packet carries the first identification information of the first sensor and third data collected by the first sensor. The processing module 802 is further configured to: establish, in the first data table after second feedback information is received, the correspondence among the second identification information of the first sensor, the first target Ethernet data packet, and the packet identification information of the first target Ethernet data packet. The second feedback information indicates that the receiver successfully receives the third information. The first target Ethernet data packet is the second Ethernet data packet. Identification information of the first target Ethernet data packet is the packet identification information of the second Ethernet data packet.

In a possible implementation, if the first target Ethernet data packet corresponding to the second identification information of the first sensor does not exist in the first data table, the transceiver module 801 is further configured to send fifth information. The fifth information includes fifth indication information and the first Ethernet data packet. The fifth indication information indicates at least one of the following information: the uncompressed first Ethernet data packet, the second identification information of the first sensor, and packet identification information of the first Ethernet data packet. The processing module 802 is further configured to: establish, in the first data table after third feedback information is received, a correspondence among the second identification information of the first sensor, the first Ethernet data packet, and the packet identification information of the first Ethernet data packet. The third feedback information indicates that the receiver successfully receives the fifth information.

In another embodiment, the apparatus 800 is used in a receiver.

The transceiver module 801 is configured to receive first information. The first information includes first indication information and target coding deviation information. The first indication information indicates at least one of the following information: the target coding deviation information being compressed information, second identification information of a first sensor, and packet identification information of a first target Ethernet data packet. The processing module 802 is configured to obtain, from a second data table, the first target Ethernet data packet corresponding to the second identification information of the first sensor and the packet identification information of the first target Ethernet data packet. The second data table includes a correspondence among the second identification information of the sensor, an Ethernet data packet, and packet identification information of the Ethernet data packet. The first target Ethernet data packet carries first identification information of the first sensor and second data collected by the first sensor. The processing module 802 is further configured to decode the target coding deviation information by using a preset decoding algorithm to obtain target deviation information. The target deviation information indicates deviation information between a first Ethernet data packet and the first target Ethernet data packet. The first Ethernet data packet carries the first identification information of the first sensor and first data collected by the first sensor. The processing module 802 is further configured to restore the first Ethernet data packet based on the first target Ethernet data packet and the target deviation information.

In a possible implementation, the first target Ethernet data packet is one of K target Ethernet data packets. The K target Ethernet data packets are in one-to-one correspondence with K pieces of packet identification information. The K target Ethernet data packets all correspond to the second identification information of the first sensor. K is less than or equal to M. M is a preset upper limit value of a quantity of target Ethernet data packets corresponding to the second identification information of the first sensor.

In a possible implementation, the transceiver module 801 is further configured to receive second information. The second information includes second indication information and the first target Ethernet data packet. The second indication information indicates at least one of the following information: the uncompressed first target Ethernet data packet, the second identification information of the first sensor, and the packet identification information of the first target Ethernet data packet. The processing module 802 is further configured to establish, in the second data table, a correspondence among the second identification information of the first sensor, the first target Ethernet data packet, and the packet identification information of the first target Ethernet data packet. The transceiver module 801 is further configured to send first feedback information. The first feedback information indicates that the receiver successfully receives the second information.

In a possible implementation, the processing module 802 is specifically configured to: receive fourth information, where the fourth information indicates to delete a correspondence among the second identification information of the first sensor, an $i^{th}$ Ethernet data packet, and packet identification information of the $i^{th}$ Ethernet data packet, and i is less than M; and after the correspondence among the second identification information of the first sensor, the $i^{th}$ Ethernet data packet, and the packet identification information of the $i^{th}$ Ethernet data packet is deleted from the second data table, establish, in the second data table, the correspondence among the second identification information of the first sensor, the first target Ethernet data, and the packet identification information of the first target Ethernet data packet.

In a possible implementation, when the first feedback information is not sent, the transceiver module 801 is further configured to receive third information. The third information includes third indication information and a second Ethernet data packet. The third indication information indicates at least one of the following information: the uncompressed second Ethernet data packet, the second identification information of the first sensor, and packet identification information of the second Ethernet data packet. The second Ethernet data packet carries the first identification information of the first sensor and third data collected by the first sensor. The processing module 802 is further configured to establish, in the second data table, the correspondence among the second identification information of the first sensor, the first target Ethernet data packet, and the packet identification information of the first target Ethernet data packet. The first target Ethernet data packet is the second Ethernet data packet. Identification information of the first target Ethernet data packet is the packet identification information of the second Ethernet data packet. The transceiver module 801 is further configured to send second feedback information. The second feedback information indicates that the receiver successfully receives the third information.

In a possible implementation, the transceiver module 801 is further configured to receive fifth information. The fifth information includes fifth indication information and the first Ethernet data packet. The fifth indication information indicates at least one of the following information: the uncompressed first Ethernet data packet, the second identification information of the first sensor, and packet identification information of the first Ethernet data packet. The processing module 802 is further configured to establish, in the second data table, a correspondence among the second identification information of the first sensor, the first Ethernet data packet, and the packet identification information of the first Ethernet data packet. The transceiver module 801 is further configured to send third feedback information. The third feedback information indicates that the receiver successfully receives the fifth information.

Figure 9:
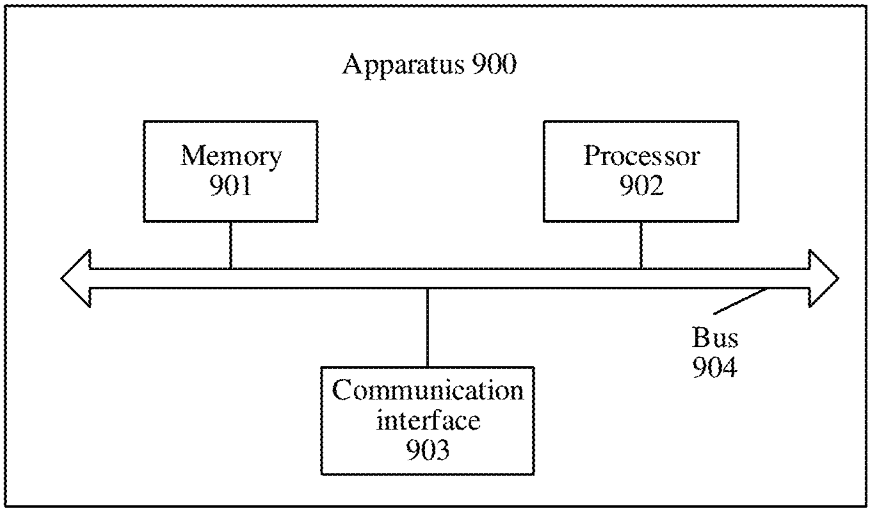
FIG. 9 is a diagram of a structure of an information processing apparatus according to another embodiment of this application.

FIG. 9 is a diagram of a structure of an information processing apparatus according to another embodiment of this application. The apparatus shown in FIG. 9 may be configured to perform the method according to any one of the foregoing embodiments.

As shown in FIG. 9, the apparatus 900 in this embodiment includes a memory 901, a processor 902, a communication interface 903, and a bus 904. The memory 901, the processor 902, and the communication interface 903 implement a communication connection to each other through the bus 904.

The memory 901 may be a read-only memory (read-only memory, ROM), a static storage device, a dynamic storage device, or a random access memory (random access memory, RAM). The memory 901 may store a program. When the program stored in the memory 901 is executed by the processor 902, the processor 902 is configured to perform the steps of the methods shown in FIG. 2 to FIG. 5.

The processor 902 may be a general-purpose central processing unit (central processing unit, CPU), a microprocessor, an application-specific integrated circuit (application-specific integrated circuit, ASIC), or one or more integrated circuits, and is configured to execute a related program, to implement the methods shown in FIG. 2 to FIG. 5 in this application.

Alternatively, the processor 902 may be an integrated circuit chip, and has a signal processing capability. In an implementation process, the steps of the methods in FIG. 2 to FIG. 5 in embodiments of this application may be completed by an integrated logic circuit of hardware in the processor 902 or by using instructions in a form of software.

The foregoing processor 902 may alternatively be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like.

The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information in the memory 901, and completes, in combination with hardware of the processor, functions that need to be performed by units included in the apparatus in this application. For example, the steps/functions in the embodiments shown in FIG. 2 to FIG. 5 may be performed.

The communication interface 903 may use, but is not limited to, a transceiver apparatus such as a transceiver, to implement communication between the apparatus 900 and another device or a communication network.

The bus 904 may include a path for transmitting information between components (for example, the memory 901, the processor 902, and the communication interface 903) of the apparatus 900.

It should be understood that, the apparatus 900 shown in this embodiment of this application may be an electronic device, or may be a chip configured in an electronic device.

All or some of the foregoing embodiments may be implemented by using software, hardware, firmware, or any combination thereof. When the software is used for implementation, the foregoing embodiments may be implemented completely or partially in a form of a computer program product. The computer program product includes one or more computer instructions or computer programs. When the computer instructions or the computer programs are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash disk, a removable hard disk drive, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

generating a first Ethernet data packet, wherein the first Ethernet data packet carries first identification information of a first sensor or first data collected by the first sensor;

determining second identification information of the first sensor that has a preset mapping relationship with the first identification information of the first sensor;

in response to a first target Ethernet data packet corresponding to the second identification information of the first sensor existing in a first data table, determining target deviation information between the first Ethernet data packet and the first target Ethernet data packet, wherein the first target Ethernet data packet carries the first identification information of the first sensor and second data collected by the first sensor;

compressing the target deviation information based on a preset coding algorithm to obtain target coding deviation information;

obtaining packet identification information of the first target Ethernet data packet from the first data table;

sending first information, wherein the first information comprises first indication information or the target coding deviation information, and the first indication information indicates: the target coding deviation information being compressed information, the second identification information of the first sensor, or the packet identification information of the first target Ethernet data packet;

generating the first target Ethernet data packet;

sending second information, wherein the second information comprises second indication information and the first target Ethernet data packet;

in response to J target Ethernet data packets corresponding to the second identification information of the first sensor existing in the first data table, obtaining J pieces of deviation information of the first target Ethernet data packet that correspond to the J target Ethernet data packets, M is a preset upper limit value of a quantity of target Ethernet data packets corresponding to the second identification information of the first sensor, wherein J is less than M; and sending the second information when a ratio of a quantity of bit values that are a target value and that are comprised in a first piece of deviation information of the J pieces of deviation information to a total quantity of bits corresponding to the first piece of deviation information and a first preset threshold meet a preset condition, wherein the target value comprises 0 or 1, and the preset condition comprises: when the target value is 0, a ratio of a quantity of bit values that are 0 and that are comprised in a first piece of deviation information of the J pieces of deviation information to a total quantity of bits corresponding to the first piece of deviation information is less than the first preset threshold; or when the target value is 1, a ratio of a quantity of bit values that are 1 and that are comprised in a first piece of deviation information of the J pieces of deviation information to a total quantity of bits corresponding to the first piece of deviation information is greater than the first preset threshold.

2. The method according to claim 1, wherein the first target Ethernet data packet is one of K target Ethernet data packets, the K target Ethernet data packets are in one-to-one correspondence with K pieces of packet identification information, the K target Ethernet data packets all correspond to the second identification information of the first sensor, and K is less than or equal to M.

3. The method according to claim 2, wherein the method further comprises:

determining K pieces of deviation information of the first Ethernet data packet that respectively correspond to the K target Ethernet data packets; and determining, as the first target Ethernet data packet, a target Ethernet data packet corresponding to smallest deviation information in the K pieces of deviation information; and wherein determining the target deviation information between the first Ethernet data packet and the first target Ethernet data packet comprises:

determining, as the target deviation information between the first Ethernet data packet and the first target Ethernet data packet, deviation information between the first Ethernet data packet and the target Ethernet data packet corresponding to the smallest deviation information.

4. The method according to claim 1, wherein:

the second indication information indicates: uncompressed first target Ethernet data packet, the second identification information of the first sensor, or the packet identification information of the first target Ethernet data packet; and the method further comprises establishing, in the first data table after first feedback information is received, a correspondence among the second identification information of the first sensor, the first target Ethernet data packet, and the packet identification information of the first target Ethernet data packet, wherein the first feedback information indicates that a receiver successfully receives the second information.

5. The method according to claim 4, wherein sending second information comprises:

sending the second information when no target Ethernet data packet corresponding to the second identification information of the first sensor exists in the first data table.

6. The method according to claim 4, wherein the method further comprises:

sending third information when the first feedback information is not received, wherein the third information comprises third indication information and a second Ethernet data packet, the third indication information indicates: uncompressed second Ethernet data packet, the second identification information of the first sensor, and packet identification information of the second Ethernet data packet, or the second Ethernet data packet carries the first identification information of the first sensor and third data collected by the first sensor; and establishing, in the first data table after second feedback information is received, the correspondence among the second identification information of the first sensor, the first target Ethernet data packet, and the packet identification information of the first target Ethernet data packet, wherein the second feedback information indicates that the receiver successfully receives the third information, the first target Ethernet data packet is the second Ethernet data packet, and identification information of the first target Ethernet data packet is the packet identification information of the second Ethernet data packet.

7. The method according to claim 4, wherein in response to the first target Ethernet data packet corresponding to the second identification information of the first sensor not existing in the first data table, the method further comprises:

sending fifth information, wherein the fifth information comprises fifth indication information and the first Ethernet data packet, and the fifth indication information indicates: uncompressed first Ethernet data packet, the second identification information of the first sensor, or packet identification information of the first Ethernet data packet; and establishing, in the first data table after third feedback information is received, a correspondence among the second identification information of the first sensor, the first Ethernet data packet, and the packet identification information of the first Ethernet data packet, wherein the third feedback information indicates that the receiver successfully receives the fifth information.

8. The method according to claim 1, wherein sending the second information comprises:

in response to M target Ethernet data packets corresponding to the second identification information of the first sensor existing in the first data table, obtaining M pieces of deviation information of the first target Ethernet data packet that respectively correspond to the M target Ethernet data packets;

sending the second information when a ratio of a quantity of bit values that are target values and that are comprised in a first piece of deviation information of the M pieces of deviation information to a total quantity of bits corresponding to the first piece of deviation information and a second preset threshold meet the preset condition; and establishing, in the first data table after first feedback information is received, a correspondence among the second identification information of the first sensor, the first target Ethernet data packet, and the packet identification information of the first target Ethernet data packet comprises:

after the first feedback information is received, when a correspondence among the second identification information of the first sensor, an $i^{th}$ Ethernet data packet, and packet identification information of the $i^{th}$ Ethernet data packet is deleted from the first data table, establishing, in the first data table, the correspondence among the second identification information of the first sensor, the first target Ethernet data packet, and the packet identification information of the first target Ethernet data packet, wherein the $i^{th}$ Ethernet data packet is a target Ethernet data packet that is in the M target Ethernet data packets and that corresponds to a maximum ratio in the deviation information between the target Ethernet data packet and the first target Ethernet data packet.

9. The method according to claim 8, wherein the method further comprises:

sending fourth information, wherein the fourth information indicates to delete the correspondence among the second identification information of the first sensor, an $i^{th}$ Ethernet data packet, and packet identification information of the $i^{th}$ Ethernet data packet.

10. A non-transitory computer-readable storage medium, wherein the computer-readable medium stores instructions to be executed by a computer; and when the instructions are executed, a method comprising:

generating a first Ethernet data packet, wherein the first Ethernet data packet carries first identification information of a first sensor or first data collected by the first sensor;

determining second identification information of the first sensor that has a preset mapping relationship with the first identification information of the first sensor;

in response to a first target Ethernet data packet corresponding to the second identification information of the first sensor existing in a first data table, determining target deviation information between the first Ethernet data packet and the first target Ethernet data packet, wherein the first target Ethernet data packet carries the first identification information of the first sensor and second data collected by the first sensor;

compressing the target deviation information based on a preset coding algorithm to obtain target coding deviation information;

obtaining packet identification information of the first target Ethernet data packet from the first data table;

sending first information, wherein the first information comprises first indication information or the target coding deviation information, and the first indication information indicates: the target coding deviation information being compressed information, the second identification information of the first sensor, or the packet identification information of the first target Ethernet data packet;

generating the first target Ethernet data packet;

sending second information, wherein the second information comprises second indication information and the first target Ethernet data packet;

in response to J target Ethernet data packets corresponding to the second identification information of the first sensor existing in the first data table, obtaining J pieces of deviation information of the first target Ethernet data packet that correspond to the J target Ethernet data packets, M is a preset upper limit value of a quantity of target Ethernet data packets corresponding to the second identification information of the first sensor, wherein J is less than M; and sending the second information when a ratio of a quantity of bit values that are a target value and that are comprised in a first piece of deviation information of the J pieces of deviation information to a total quantity of bits corresponding to the first piece of deviation information and a first preset threshold meet a preset condition, wherein the target value comprises 0 or 1, and the preset condition comprises: when the target value is 0, a ratio of a quantity of bit values that are 0 and that are comprised in a first piece of deviation information of the J pieces of deviation information to a total quantity of bits corresponding to the first piece of deviation information is less than the first preset threshold; or when the target value is 1, a ratio of a quantity of bit values that are 1 and that are comprised in a first piece of deviation information of the J pieces of deviation information to a total quantity of bits corresponding to the first piece of deviation information is greater than the first preset threshold.

11. The non-transitory computer-readable storage medium according to claim 10, wherein the first target Ethernet data packet is one of K target Ethernet data packets, the K target Ethernet data packets are in one-to-one correspondence with K pieces of packet identification information, the K target Ethernet data packets all correspond to the second identification information of the first sensor, and K is less than or equal to M.

12. The non-transitory computer-readable storage medium according to claim 11, wherein the method further comprises:

determining K pieces of deviation information of the first Ethernet data packet that respectively correspond to the K target Ethernet data packets; and determining, as the first target Ethernet data packet, a target Ethernet data packet corresponding to smallest deviation information in the K pieces of deviation information; and wherein determining the target deviation information between the first Ethernet data packet and the first target Ethernet data packet comprises:

determining, as the target deviation information between the first Ethernet data packet and the first target Ethernet data packet, deviation information between the first Ethernet data packet and the target Ethernet data packet corresponding to the smallest deviation information.

13. The non-transitory computer-readable storage medium according to claim 10, wherein:

the second indication information indicates: uncompressed first target Ethernet data packet, the second identification information of the first sensor, or the packet identification information of the first target Ethernet data packet; and the method further comprises establishing, in the first data table after first feedback information is received, a correspondence among the second identification information of the first sensor, the first target Ethernet data packet, and the packet identification information of the first target Ethernet data packet, wherein the first feedback information indicates that a receiver successfully receives the second information.

14. The non-transitory computer-readable storage medium according to claim 13, wherein sending second information comprises:

sending the second information when no target Ethernet data packet corresponding to the second identification information of the first sensor exists in the first data table.

15. The non-transitory computer-readable storage medium according to claim 13, wherein the method further comprises:

sending third information when the first feedback information is not received, wherein the third information comprises third indication information and a second Ethernet data packet, the third indication information indicates: uncompressed second Ethernet data packet, the second identification information of the first sensor, and packet identification information of the second Ethernet data packet, or the second Ethernet data packet carries the first identification information of the first sensor and third data collected by the first sensor; and establishing, in the first data table after second feedback information is received, the correspondence among the second identification information of the first sensor, the first target Ethernet data packet, and the packet identification information of the first target Ethernet data packet, wherein the second feedback information indicates that the receiver successfully receives the third information, the first target Ethernet data packet is the second Ethernet data packet, and identification information of the first target Ethernet data packet is the packet identification information of the second Ethernet data packet.

16. The non-transitory computer-readable storage medium according to claim 13, wherein in response to the first target Ethernet data packet corresponding to the second identification information of the first sensor does not existing in the first data table, the method further comprises:

sending fifth information, wherein the fifth information comprises fifth indication information and the first Ethernet data packet, and the fifth indication information indicates: uncompressed first Ethernet data packet, the second identification information of the first sensor, or packet identification information of the first Ethernet data packet; and establishing, in the first data table after third feedback information is received, a correspondence among the second identification information of the first sensor, the first Ethernet data packet, and the packet identification information of the first Ethernet data packet, wherein the third feedback information indicates that the receiver successfully receives the fifth information.

17. An apparatus, comprising:

at least one processor; and at least one memory coupled to the at least one processor and configured to store programming instructions that, when executed by the at least one processor, cause the apparatus to:

generate a first Ethernet data packet, wherein the first Ethernet data packet carries first identification information of a first sensor or first data collected by the first sensor;

determine second identification information of the first sensor that has a preset mapping relationship with the first identification information of the first sensor;

in response to a first target Ethernet data packet corresponding to the second identification information of the first sensor existing in a first data table, determine target deviation information between the first Ethernet data packet and the first target Ethernet data packet, wherein the first target Ethernet data packet carries the first identification information of the first sensor and second data collected by the first sensor;

compress the target deviation information based on a preset coding algorithm to obtain target coding deviation information;

obtain packet identification information of the first target Ethernet data packet from the first data table;

send first information, wherein the first information comprises first indication information or the target coding deviation information, and the first indication information indicates: the target coding deviation information being compressed information, the second identification information of the first sensor, or the packet identification information of the first target Ethernet data packet;

generate the first target Ethernet data packet;

send second information, wherein the second information comprises second indication information and the first target Ethernet data packet;

in response to J target Ethernet data packets corresponding to the second identification information of the first sensor existing in the first data table, obtain J pieces of deviation information of the first target Ethernet data packet that correspond to the J target Ethernet data packets, M is a preset upper limit value of a quantity of target Ethernet data packets corresponding to the second identification information of the first sensor, wherein J is less than M; and send the second information when a ratio of a quantity of bit values that are a target value and that are comprised in a first piece of deviation information of the J pieces of deviation information to a total quantity of bits corresponding to the first piece of deviation information and a first preset threshold meet a preset condition, wherein the target value comprises 0 or 1, and the preset condition comprises: when the target value is 0, a ratio of a quantity of bit values that are 0 and that are comprised in a first piece of deviation information of the J pieces of deviation information to a total quantity of bits corresponding to the first piece of deviation information is less than the first preset threshold; or when the target value is 1, a ratio of a quantity of bit values that are 1 and that are comprised in a first piece of deviation information of the J pieces of deviation information to a total quantity of bits corresponding to the first piece of deviation information is greater than the first preset threshold.

18. The apparatus according to claim 17, wherein the first target Ethernet data packet is one of K target Ethernet data packets, the K target Ethernet data packets are in one-to-one correspondence with K pieces of packet identification information, the K target Ethernet data packets all correspond to the second identification information of the first sensor, and K is less than or equal to M.

19. The apparatus according to claim 18, wherein the programming instructions that, when executed by the at least one processor, further cause the apparatus to:

determine K pieces of deviation information of the first Ethernet data packet that respectively correspond to the K target Ethernet data packets; and determine, as the first target Ethernet data packet, a target Ethernet data packet corresponding to smallest deviation information in the K pieces of deviation information; and wherein determining the target deviation information between the first Ethernet data packet and the first target Ethernet data packet comprises:

determining, as the target deviation information between the first Ethernet data packet and the first target Ethernet data packet, deviation information between the first Ethernet data packet and the target Ethernet data packet corresponding to the smallest deviation information.

20. The apparatus according to claim 17, wherein:

the second indication information indicates: uncompressed first target Ethernet data packet, the second identification information of the first sensor, or the packet identification information of the first target Ethernet data packet; and the programming instructions that, when executed by the at least one processor, further cause the apparatus to:

establish, in the first data table after first feedback information is received, a correspondence among the second identification information of the first sensor, the first target Ethernet data packet, and the packet identification information of the first target Ethernet data packet, wherein the first feedback information indicates that a receiver successfully receives the second information.

* * * * *